US012789532B2

(12) United States Patent
Kaneko

(10) Patent No.: US 12,789,532 B2
(45) Date of Patent: Nov. 10, 2026

(54) INK STORAGE BOTTLE HAVING A MAIN BODY OF A RECYCLED PLASTIC MATERIAL OR A RESIN MATERIAL OF MIXED RECYCLED MATERIALS

(71) Applicant: CANON KABUSHIKI KAISHA, Tokyo (JP)

(72) Inventor: Masato Kaneko, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 18/762,350

(22) Filed: Jul. 2, 2024

(65) Prior Publication Data

US 2025/0042172 A1 Feb. 6, 2025

(30) Foreign Application Priority Data

Aug. 4, 2023 (JP) ................................ 2023-127495
Apr. 24, 2024 (JP) ................................ 2024-070338

(51) Int. Cl.
*B41J 2/175* (2006.01)

(52) U.S. Cl.
CPC ....... *B41J 2/17559* (2013.01); *B41J 2/17506* (2013.01)

(58) Field of Classification Search
CPC .................................................. B41J 2/17559
USPC .......................................................... 347/86
See application file for complete search history.

(56) References Cited

U.S. PATENT DOCUMENTS 5,337,924 A * 8/1994 Dickie ..................... B65D 1/32 222/215
2003/0230654 A1* 12/2003 Treleaven ............... B29C 48/92 209/580
2019/0161225 A1* 5/2019 Sager ..................... B65D 65/46
2020/0307230 A1 10/2020 Nagai et al.

FOREIGN PATENT DOCUMENTS

CA 3166140 A1 * 8/2021 ............. B32B 27/08
CN 107073798 A 8/2017
CN 111746903 A 10/2020
(Continued)

OTHER PUBLICATIONS

A. Lontos, A. Gregoriou, The effect of the deformation rate on the wall thickness of 1.5LT PET bottle during ISBM (Injection Stretch Blow Molding) process, 2019, Procedia CIRP, vol. 81, pp. 1307-1312 (Year: 2019).*

(Continued)

*Primary Examiner* — Douglas X Rodriguez
*Assistant Examiner* — Rami A Alshoroogi
(74) *Attorney, Agent, or Firm* — Venable LLP

(57) ABSTRACT

An ink storage bottle including a bottle main body, a nozzle configured to supply ink externally, and a cap configured to cover the nozzle, wherein the bottle main body contains a recycled plastic material or a resin material obtained by mixing recycled plastic materials, and A>1 mm and A/B>1 are satisfied, where A is a thickness of a bottom surface center of the bottle main body and B is an average thickness of a bottom surface edge of the bottle main body, wherein, B is the average thickness measured at a plurality of positions, at least some of the thicknesses used to calculate B being different from each other.

12 Claims, 16 Drawing Sheets

(56) References Cited

FOREIGN PATENT DOCUMENTS

| | | | | |
|---|---|---|---|---|
| JP | 2020-164230 | | 10/2020 | |
| WO | WO-9624482 | A1 * | 8/1996 | ............. B29C 49/12 |
| WO | 2006/062075 | | 6/2006 | |
| WO | WO-2020053210 | A1 * | 3/2020 | ........... B65D 1/0276 |

OTHER PUBLICATIONS

Chinese Office Action issued Jul. 21, 2026, in corresponding Chinese Patent Application No. 202411026258.9, with English translations (13 pages).

* cited by examiner

| | | | THICKNESS [mm] | | | | | | |
|---|---|---|---|---|---|---|---|---|---|
| | | | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 |
| POSITION | BOTTOM SURFACE CENTER | A1 | 4.2 | 2.6 | 1.4 | 3.6 | 0.6 | 1.9 | 0.9 |
| | BOTTOM SURFACE EDGE | B11(Bmin) | 0.6 | 0.9 | 1.1 | 0.7 | 0.5 | 1.6 | 0.5 |
| | | B12 | 3.6 | 2.4 | 1.5 | 3.3 | 1.5 | 3.7 | 0.8 |
| | | B13(Bmin) | 0.6 | 0.9 | 1.1 | 0.7 | 0.5 | 1.6 | 0.5 |
| | | B14 | 3.6 | 2.4 | 1.5 | 3.3 | 1.5 | 3.7 | 0.8 |
| | | Bave | 2.1 | 1.7 | 1.3 | 2.0 | 1.0 | 2.7 | 0.7 |
| | SIDE SURFACE CENTER | C11 | 1.6 | 1.7 | 1.3 | 2.9 | 0.9 | 1.8 | 0.7 |
| | | C13 | 1.6 | 1.7 | 1.3 | 2.9 | 0.9 | 1.8 | 0.7 |
| THICKNESS RATE | A/Bave | | 2.0 | 1.5 | 1.1 | 2.0 | 0.6 | 0.7 | 1.4 |
| | A/Bmin | | 7.0 | 2.9 | 1.3 | 5.1 | 1.2 | 1.2 | 1.8 |
| | C/Bmin | | 2.7 | 1.9 | 1.2 | 4.1 | 1.8 | 1.1 | 1.4 |
| EVALUATION RESULT | LEAKAGE | | OK | OK | OK | OK | NG | OK | NG |
| | DROP/COLLISION | | OK | OK | OK | OK | NG | NG | OK |

FIG.10

INK STORAGE BOTTLE HAVING A MAIN BODY OF A RECYCLED PLASTIC MATERIAL OR A RESIN MATERIAL OF MIXED RECYCLED MATERIALS

BACKGROUND OF THE INVENTION

Cross-Reference to Priority Application

This application claims the benefit of Japanese Patent Applications No. 2023-127495, filed Aug. 4, 2023, and No. 2024-070338, filed Apr. 24, 2024, which are hereby incorporated by reference herein in their entirety.

FIELD OF THE INVENTION

The present disclosure relates to a liquid storage bottle that stores liquid therein.

DESCRIPTION OF THE RELATED ART

In recent years, there has been a necessity to recycle plastics for the achievement of a sustainable society, such as a decarbonized society/circular society. From the viewpoint of the recycling of plastic materials, there is known a method of forming waste plastic materials into pellets, mixing them with virgin material pellets for molding, and performing molding. International Publication No. WO 2006/062075 discloses a method of mixing flakes produced from used polyethylene terephthalate (PET) bottles with polyester resin pellets and producing a molded article.

Some of liquid tanks provided in a liquid ejection apparatus such as an inkjet printing apparatus comprise an inlet to inject liquid so that liquid can be refilled from a separately-prepared liquid storage bottle through the inlet. For example, a liquid storage bottle shown in Japanese Patent Laid-Open No. 2020-164230 comprises a nozzle for injecting liquid into an inlet of a liquid tank and a bottle main body storing liquid.

In a case when a recycled plastic material is used for the bottle main body of the liquid storage bottle, there is a possibility that liquid leaks from the bottle main body or bursts from a nozzle opening at the time of drop/collision.

SUMMARY OF THE INVENTION

A liquid storage bottle according to an aspect of this disclosure is a liquid storage bottle comprising a bottle main body, a nozzle configured to supply liquid externally, and a cap configured to cover the nozzle, wherein the bottle main body contains a recycled plastic material or a resin material obtained by mixing recycled plastic materials, and $A>1$ mm and $A/B>1$ are satisfied, where A is a thickness of a bottom surface center of the bottle main body and B is an average thickness of a bottom surface edge of the bottle main body.

Further features of the present invention will become apparent from the following description of exemplary embodiments with reference to the attached drawings.

BRIEF DESCRIPTION OF THE DRAWINGS

FIG. 10 is a diagram showing results of examples and comparative examples;

DESCRIPTION OF THE EMBODIMENTS

Figure 1:
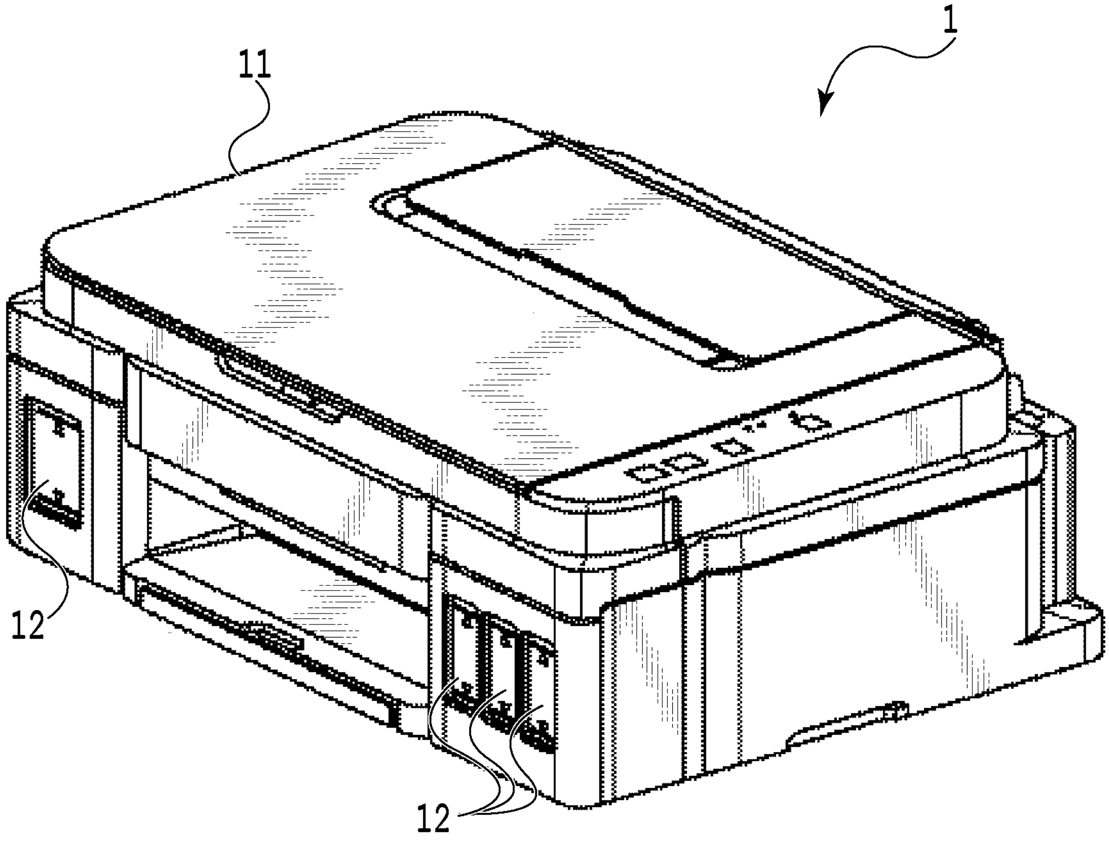
FIG. 1 is a perspective view of a liquid ejection apparatus.

Preferred embodiments of the present disclosure will be described below in detail with reference to the accompanying drawings. It should be noted that the following embodiments do not limit the matters disclosed herein and not all combinations of features described in the following embodiments are necessarily essential for solving a problem of this disclosure. The same constituent element is denoted by the same reference number. As the use of a liquid storage bottle, the refilling of liquid (ink) into a liquid ejection apparatus (inkjet printing apparatus) is described herein as an example. However, the use of the liquid storage bottle is not limited to this.

First Embodiment

<Problem of Recycled Plastic Material>

First, prior to the description of a specific configuration of an embodiment, it will be explained that, in a case when a recycled plastic material is used for a bottle main body of a liquid storage bottle, there is a possibility that liquid leaks from the bottle main body or bursts from a nozzle opening at the time of drop/collision.

In general, the use of a recycled plastic material for molding has a problem that a molding failure is caused by contaminants contained in the recycled plastic material and the impact absorbency of a molded article at the time of drop/collision is impaired. The influence is large especially in a case when the recycled plastic material is used for a liquid storage bottle for refilling an inkjet printing apparatus (liquid ejection apparatus) with ink.

First, the former molding failure will be described. The recycled plastic material is reused after passing through a cleaning process after collection. However, although depending on the cleaning method and the status at the time of collection, there is a possibility that contaminants are not completely removed and a very small amount of contaminant is included in the recycled plastic material. In a case where such a recycled plastic material is used for direct blow molding, which is one of common bottle manufacturing methods, and the molding of a bottle main body is repeated multiple times, the frequency of a molding failure in the center of a bottom surface of a bottle main body increases.

A bottom of a parison including the recycled plastic material is pinched between tips of pinch-off portions of blow molds used in direct blow molding multiple times in response to the closing of the molds. Thus, contaminants are likely to accumulate in portions of the blow molds corresponding to the tips of the pinch-off portions. In a case when contaminants accumulate above a certain level, molding is carried out with the contaminants at the tips of the pinch-off portions transferred to a bottom of a parison. Since the bottom of the parison forms a center of a bottom surface of a molded bottle, the contaminants may cause formation of a very small hole near the bottom surface center. In a case when the very small hole establishes communication between the inside and outside of the bottle, ink may leak with time and make the periphery dirty or adhere to a user's finger, or the like. In particular, a liquid storage bottle storing ink refills the liquid ejection apparatus with ink at irregular intervals. Accordingly, since a user who thinks that the last refilling was performed without any problems cannot predict an ink leakage, there is a possibility of unpredicted contamination. Further, even in a case when the very small hole does not establish communication, an impact or the like may cause the hole to establish communication and liquid may leak. This is the end of the example of the molding failure.

Next, the latter impact absorbency impairment will be described. The recycled plastic material is made from materials that have been deteriorated to no small extent by a thermal history during molding, a stress, heat, light, and solvent during use, and the like. In view of the circumstances, it is known that the recycled plastic material is different in physical property from a virgin material. For example, the recycled plastic material tends to be low in impact absorbency, which is the ability of molecular chains in the material to warp and relieve force in a case when an impact is applied. This tendency can be confirmed by the Charpy impact test. A molding material including the recycled plastic material exhibits impact strength lower than that of a virgin material. Such impairment of the impact absorbency is caused because the original molecular chains have been broken by the aforementioned deterioration and the impact absorbing effect of the molecular chains has decreased.

As a result, in a case when the liquid storage bottle drops and comes into collision, there is a possibility that the impact is not absorbed by the bottle main body and liquid inside the bottle bursts from the nozzle, adheres to the periphery, and adheres to a user during use.

A description will be given of an example of reducing the possibility that liquid leaks from the bottle main body or bursts from the nozzle opening at the time of drop/collision in a case when the recycled plastic material is used for the bottle main body of the liquid storage bottle.

<Liquid Ejection Apparatus>

FIG. 1 is a perspective view of a liquid ejection apparatus 1 in which a liquid storage bottle of the present embodiment is used. The liquid ejection apparatus 1 is a serial type inkjet printing apparatus and comprises a housing 11 and a large-capacity liquid tank 12 arranged inside the housing 11. The liquid tank 12 stores ink, which is liquid ejected to a print medium (not shown).

Figure 2:
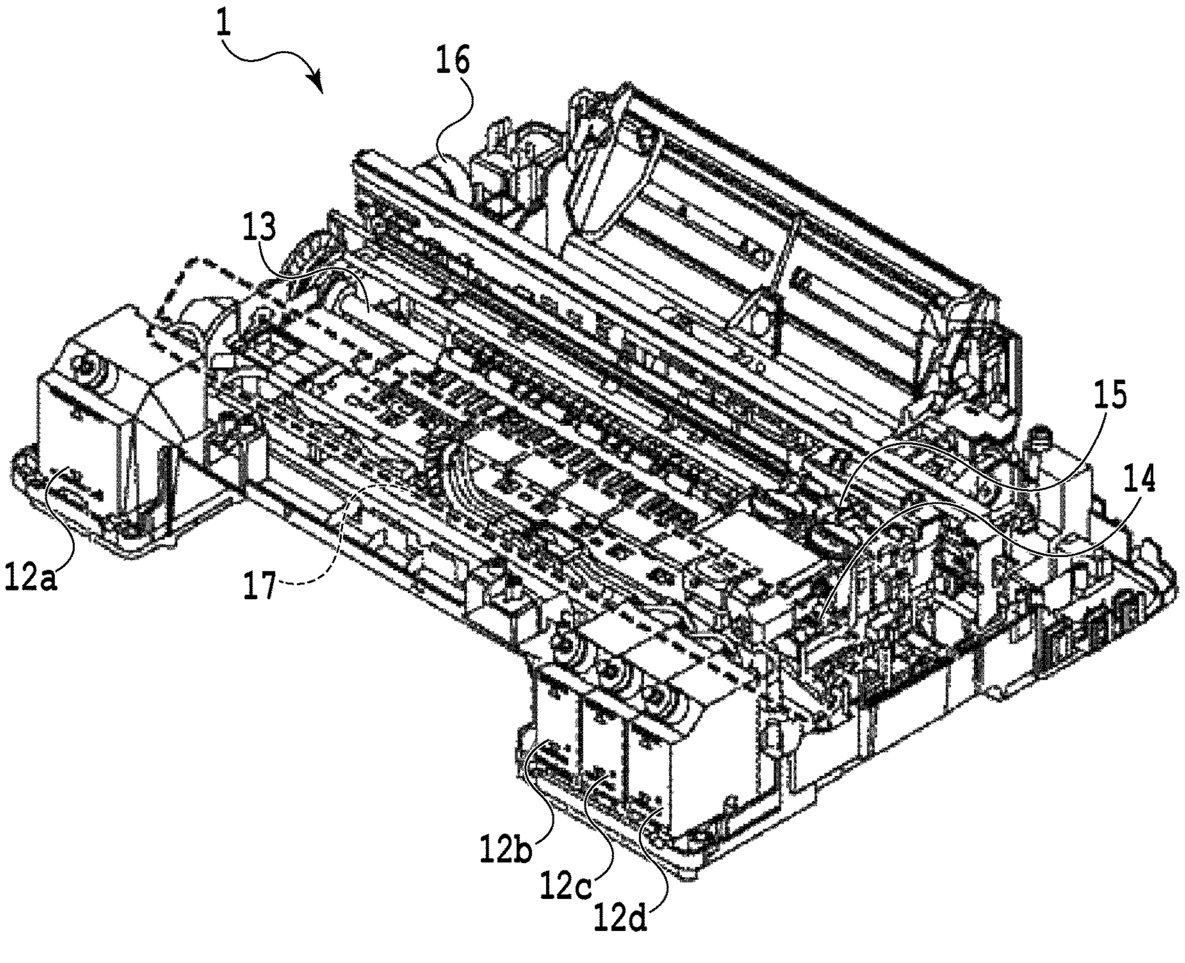
FIG. 2 is a perspective view showing an internal configuration of a main part of the liquid ejection apparatus.

FIG. 2 is a perspective view showing an internal configuration of a main part of the liquid ejection apparatus 1 shown in FIG. 1. The liquid ejection apparatus 1 comprises a conveyance roller 13 that conveys a print medium (not shown), a carriage 15 provided with a liquid ejection head 14 that ejects liquid, and a carriage motor 16 that drives the carriage 15. Examples of the print medium include paper, but the type of print medium is not particularly limited as long as an image can be formed by liquid ejected from the liquid ejection head 14. The print medium is intermittently conveyed by intermittent rotational driving of the conveyance roller 13. With rotational driving of the carriage motor 16, the carriage 15 moves reciprocally in a direction intersecting the conveyance direction of the print medium. During this reciprocal scan, liquid is ejected to the print medium from ejection openings provided in the liquid ejection head 14, whereby an image or the like is printed on the print medium.

Liquid is stored in the liquid tank 12 and supplied to the liquid ejection head 14 through a liquid flow path 17. In the present embodiment, inks of four colors (for example, cyan, magenta, yellow, and black) are used as liquid and four liquid tanks 12*a* to 12*d* storing the respective color inks are provided as the liquid tank 12. Each of the four liquid tanks 12*a* to 12*d* is arranged in the front portion of the liquid ejection apparatus 1 inside the housing 11.

Figure 3:
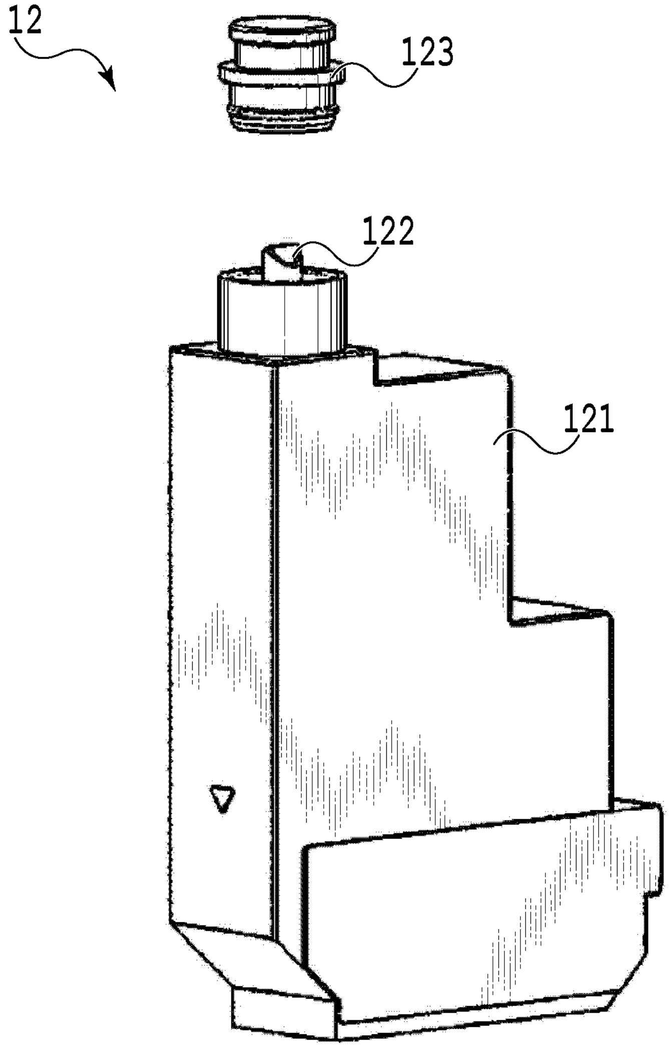
FIG. 3 is a perspective view of a liquid tank of the liquid ejection apparatus.

FIG. 3 is a perspective view of the liquid tank 12 of the liquid ejection apparatus shown in FIG. 1. One liquid tank 12 of the four liquid tanks 12*a* to 12*d* is shown here. The liquid tank 12 comprises a tank main body 121 which stores liquid, an inlet 122 in communication with a liquid chamber in the tank main body 121, and a tank cover 123 mountable on the tank main body 121 so as to cover the inlet 122. The liquid tank 12 is refilled with ink through the inlet 122 exposed by detaching the tank cover 123 from the tank main body 121. After the refilling of liquid, the tank cover 123 is attached to the tank main body 121 to seal the liquid chamber in the tank main body 121 in order to suppress ink evaporation from the liquid chamber in the tank main body 121.

<Liquid Storage Bottle>

Figure 4:
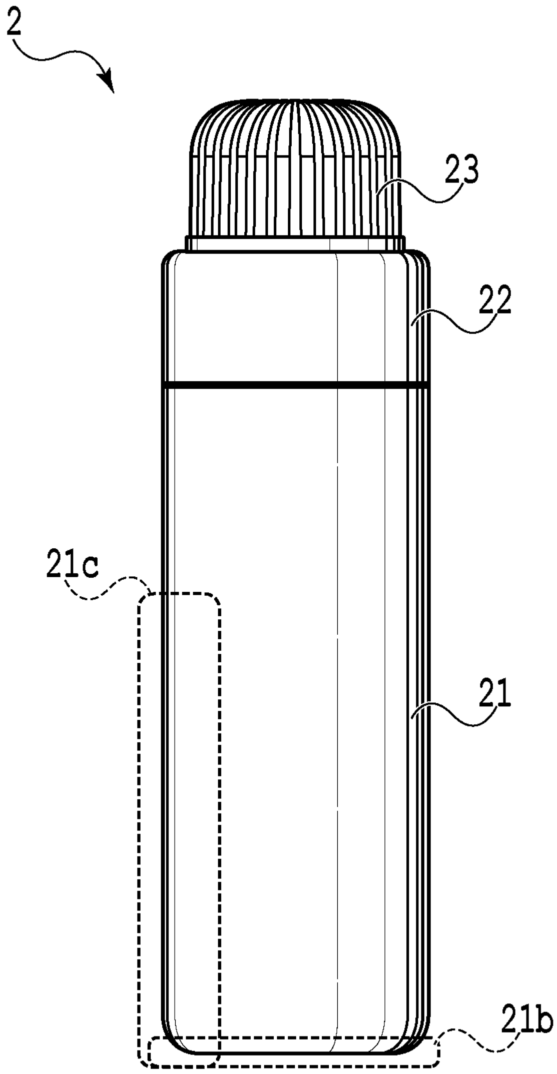
FIG. 4 is a plan view of a liquid storage bottle.
Figure 5:
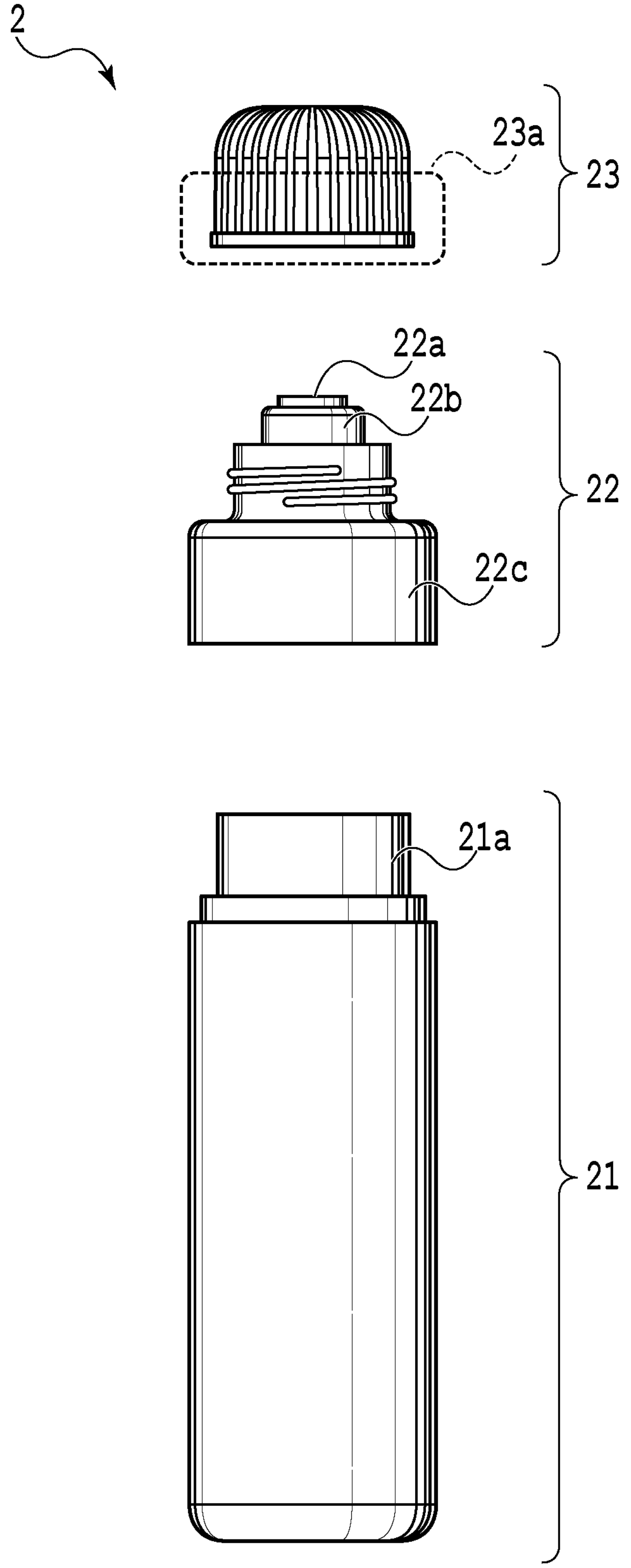
FIG. 5 is an exploded plan view of the liquid storage bottle.

FIG. 4 is a plan view of a liquid storage bottle 2 according to the present embodiment. FIG. 5 is an exploded plan view of the liquid storage bottle 2 shown in FIG. 4. The liquid storage bottle 2 is a container for refilling the liquid tank 12 with liquid and comprises a bottle main body 21 which stores liquid, a nozzle 22, and a cap 23. The nozzle 22 is fixed to the bottle main body 21 and has a function of injecting liquid stored in the bottle main body 21. The cap 23 is mountable on the nozzle 22 to open and to close an inlet 22*a* of the nozzle 22 and has a function of shielding the inside of the bottle main body 21 from the ambient air and sealing the liquid storage bottle 2. In the present embodiment, the bottle main body 21 and the nozzle 22 are both resin components and are fixed by welding. However, the bottle main body 21 and the nozzle 22 may be fixed by being sealed with a flexible component therebetween.

A bottle welding portion 21*a* is formed at the top of the bottle main body 21 and a nozzle welding portion 22*c* is formed at the bottom of the nozzle 22. The nozzle 22 is fixed to the bottle main body 21 by welding an inner peripheral surface or bottom surface of the nozzle welding portion 22*c* to the bottle welding portion 21*a*. The middle of the nozzle 22 has a nozzle thread portion 22*b* having a male thread on its outer peripheral surface and the bottom of the cap 23 has a cap thread portion 23*a* having a female thread on its inner peripheral surface. The cap 23 is mounted on the nozzle 22 by screwing the male thread of the nozzle thread portion 22*b* into the female thread of the cap thread portion 23*a*.

<Method of Manufacturing the Bottle Main Body 21>

Figure 6A:
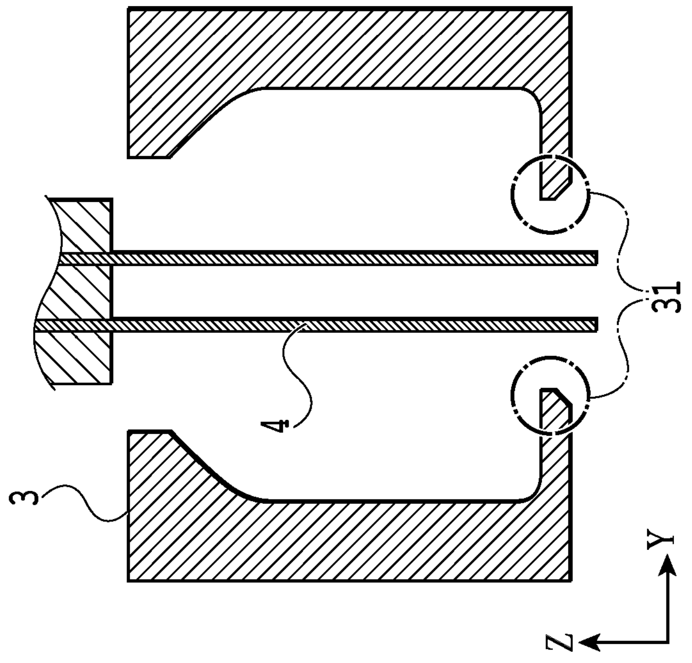
FIGS. 6A to 6C are diagrams illustrating direct blow molding.
Figure 6B:
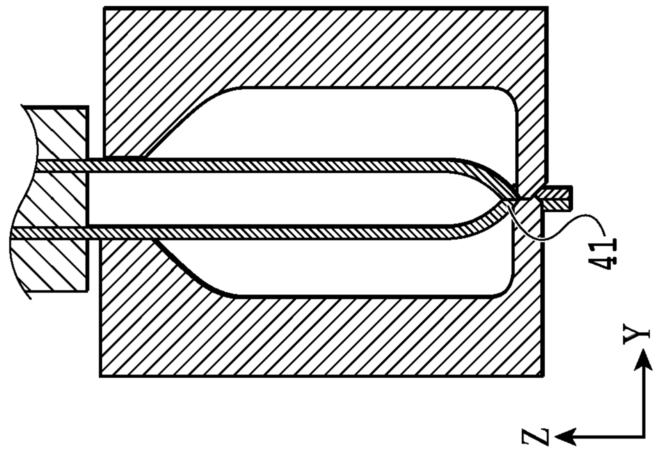
Figure 6C:
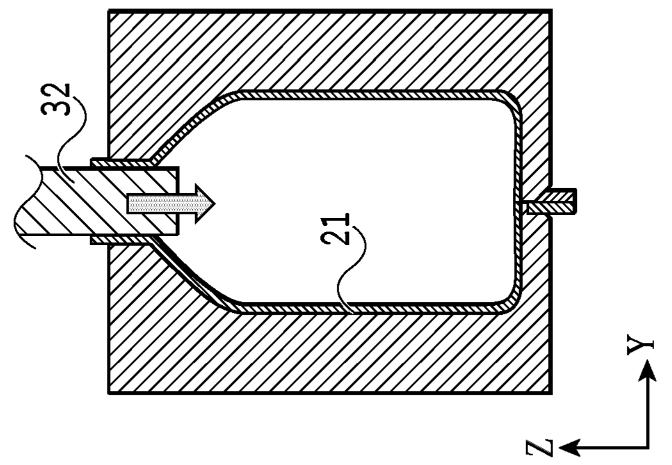

FIGS. 6A to 6C are diagrams illustrating direct blow molding, which is an example of a method of manufacturing the bottle main body 21. FIGS. 6A to 6C show three steps of direct blow molding. FIG. 6A is a parison forming step. In the parison forming step, a parison 4, which is a tubular heat-melted resin, is extruded from the top of molds 3. Next, in a pinch-off step of FIG. 6B, the molds 3 on both sides of the parison 4 are closed. Upon the closing of the molds 3, a parison bottom portion 41 is pinched between pinch-off portions 31 of the molds and the end of the tube shape is closed. Further, in a blow-up step of FIG. 6C, compressed air is blown into the parison 4 from a blow pin 32 at the top of the molds 3 and the bottle main body 21 is formed. A bottom surface of the bottle main body 21 formed by the direct blow method has a seam corresponding to the place pinched between the pinch-off portions 31.

In the present embodiment, the material for the parison 4 is virgin resin pellets mixed with pellets made from a recycled plastic material. The material is melted and kneaded at high temperature and extruded into the molds 3. The recycled plastic material used here occupies 5 wt % or more of the whole of the parison 4.

The recycled plastic material described in the present embodiment is used as a broad meaning including both a post-consumer material (PCR material) and a pre-consumer material. The post-consumer material (PCR material) is a material obtained by collecting and reusing plastic products distributed to the market. For example, the PCR material is a plastic prepared from cleaned and crushed waste products. The PCR material may be a thermoplastic prepared by a processor other than the first processor from industrial plastic wastes. The pre-consumer material is a material obtained by collecting and reusing plastic wastes produced during a manufacturing process before distribution to the market. For example, the pre-consumer material is a thermoplastic prepared from, after processing such as molding and extrusion in a processor's factory, offcuts resulting from reprocessing in the same factory or rejected molded articles. In the present embodiment, the recycled plastic material may be the PCR material, the pre-consumer material, or a mixture thereof.

In the present embodiment, a recycled plastic material can be used after determination whether the recycled plastic material is suitable for use based on a size of contaminants. For example, a thin sample plate is molded and, in a case when a size of contaminants on the surface of the plate is less than a predetermined value, the material is determined to be a recycled plastic material suitable for use. This predetermined value relates to a thickness of the bottom surface of the bottle main body 21, as will be described later. In the present embodiment, the predetermined value is assumed to be 1 $mm^2$. The parison 4 used here is obtained by mixing pellets made from such recycled plastics with virgin resin pellets.

As a resin material for use, a resin material common in blow molding is used together with the virgin material and the recycled plastic material. For example, any of polypropylene (PP), polyethylene (PE), polyethylene terephthalate (PET), polyvinyl chloride (PVC), and polystyrene (PS) may be used. However, the resin material is not limited to this. A resin material other than the above may be used and a plurality of materials may be used. That is, the recycled plastic material can use one of PP, PE, PET, PVC, and PS or a mixture of two or more of them.

Figure 7A:
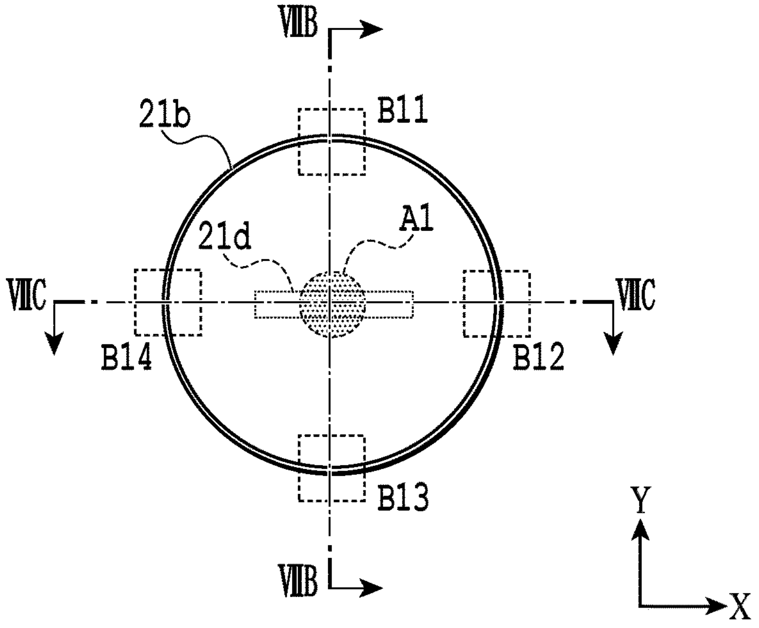
FIGS. 7A to 7C are diagrams illustrating a bottom surface of a bottle main body.
Figure 7B:
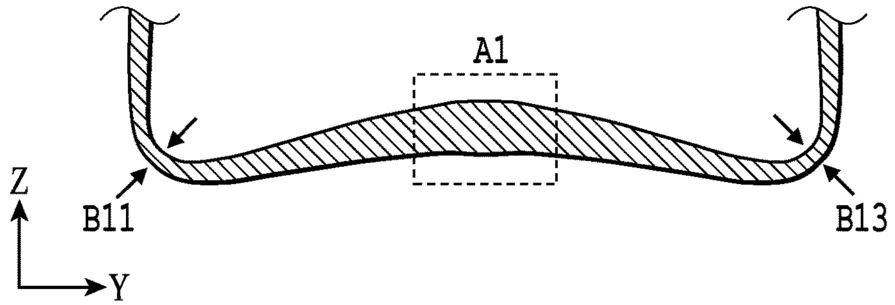
Figure 7C:
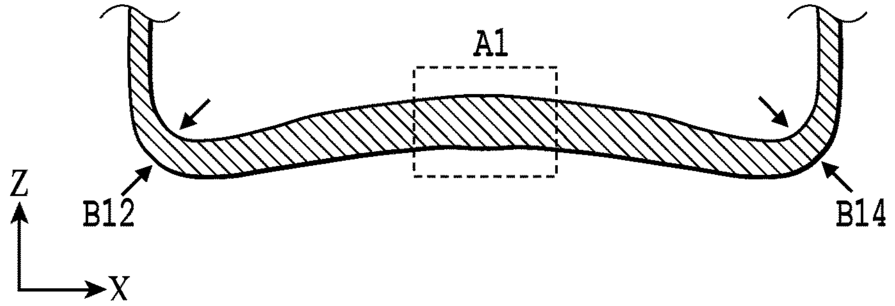

FIGS. 7A to 7C are diagrams illustrating the bottom surface of the bottle main body 21. FIGS. 7A to 7C are cross-sectional views of the bottom surface 21*b* in a case when the bottle main body has a cylindrical shape. FIG. 7A shows an XY cross section seen from above the bottle. FIG. 7B shows a VIIb-VIIb cross section (YZ cross section). FIG. 7C shows a VIIc-VIIc cross section (XZ cross section). It is assumed here that a direction in which the parison bottom portion 41 is pinched between the pinch-off portions 31 is a Y axis. That is, molding is performed with the parison bottom portion 41 pinched and crushed to extend in the X direction. An area 21*d* in FIG. 7A shows an area in which the parison bottom portion 41 is directly pinched between the pinch-off portions 31.

Here, a thickness of the bottle bottom surface center is denoted by A1 and thicknesses of the bottle bottom surface edge are denoted by B11 to B14. B11 to B14 are set so that B11 is at twelve o'clock position on the circumference of the bottle bottom surface in FIG. 7A and B12 to B14 are arranged clockwise every 90°. That is, the thicknesses are defined so that the bottle bottom surface edge has thicknesses B12 and B14 in the direction (X direction) of extension of the area 21*d* pinched between the pinch-off portions 31.

The thickness A1 of the bottle bottom surface center is defined as an average thickness in a circular area concentric with the bottle bottom surface and having a diameter one-fifth the bottle diameter. The thickness A1 is a thickness in the Z direction. Each of the thicknesses B11 to B14 of the bottle bottom surface edge is a thickness of the most curved part of a corner portion formed by the bottle bottom surface edge and the lower part of the side surface. In other words, each of the thicknesses B11 to B14 of the bottle bottom surface edge is a thickness of the most curved part of a corner portion of a cross section along the Z axis and the axis of the bottle diameter direction (YZ cross section, XZ cross section). Each of the thicknesses B11 to B14 is a thickness of the corresponding cross section in the curvature radius direction. Further, each of the thicknesses B11 to B14 of the bottle bottom surface edge is an average value in an area described below on the circumference of the bottle bottom surface edge. B11 is described as an example. As shown by a dashed frame in FIG. 7A, an area used for averaging processing for calculating B11 is a square area viewed from the top of the bottle. The center of the area is positioned to have the largest Y coordinate on the circumference of the bottle bottom surface edge. The length of one side is one-fifth the bottle diameter. The area is arranged so that two of the four sides of the square are substantially orthogonal to the circumference of the bottle bottom surface edge. An average thickness in this square area is defined as B11. For B12 to B14, square areas are similarly defined so that their centers are arranged clockwise every 90° around the bottle bottom surface center in the same manner as for B11. The center of the square for B12 is positioned to have the largest X coordinate on the circumference of the bottle bottom surface edge. The center of the square for B13 is positioned to have the smallest Y coordinate on the circumference of the bottle bottom surface edge. The center of the square for B14 is positioned to have the smallest X coordinate on the circumference of the bottle bottom surface edge. However, the above definition of the thicknesses is merely an example and the thicknesses are not limited to this example. The length of the side of the square may be changed or each thickness may be defined as a thickness in a rectangular area. Further, the shape is not limited to a rectangle and may be defined as a circle.

As a concrete example of the values, it is assumed that A1 is greater than 1 mm and also greater than the average value of B11 to B14. As described above, in the recycled plastic material used in the present embodiment, an allowable contaminant size in the sample plate is defined as 1 $mm^2$.

Thus, a contaminant thickness is assumed to be 1 mm and A1 is set at a value greater than 1 mm in relation to the allowable contaminant size.

Of B11 to B14, B11 and B13 along the Y axis are thicknesses smaller than B12 and B14 along the X axis. According to this configuration, the bottle main body 21 becomes easy to warp locally at the time of drop/collision and thus the impact absorbency can be improved. Incidentally, a drop/collision surface may be any surface of the liquid storage bottle 2. Irrespective of which surface is a collision surface, the bottle main body 21 is easy to warp locally at the time of drop/collision.

Direct blow molding is an example of a manufacturing method that enables such a thickness difference. In direct blow molding, the parison bottom portion 41 is pinched between the pinch-off portions 31 in the Y direction. In a case when blowing is performed in this state, the amount of extension to wall surfaces of the molds in the Y direction is greater than that in the X direction. More specifically, through the blowing, the bottle bottom surface is formed by being expanded concentrically from the area 21*d* pinched between the pinch-off portions 31. On the assumption that L1 is a distance between the center of the area 21*d* pinched between the pinch-off portions 31 and a mold wall surface in the Y direction (B11, B13) and L2 is a distance between an end of the area 21*d* and a mold wall surface in the X direction (B12, B14), L1 is greater than L2. Thus, the amount of expansion in the Y direction is greater than that in the X direction. As a result, the thicknesses of the bottom surface edge positioned in the Y direction are reduced. In this manner, the thicknesses B11 and B13 of the edge of the bottle bottom surface in the first axis can be less than the thicknesses B12 and B14 of the edge in the second axis. The first axis is an axis in parallel with the direction of pinching between the pinch-off portions 31 and the second axis is an axis intersecting with (substantially orthogonal to) the first axis. Incidentally, from the viewpoint of the strength, it is preferable that the minimum thicknesses B11 and B13 be equal to or greater than 0.1 times of A1. It is also preferable that the thickness A1 of the bottle bottom surface center be greater than the minimum thicknesses B11 and B13 of the bottle bottom surface edge. That is, it is preferable that the thickness of the bottom surface of the bottle main body satisfy $1<A/Bmin<10$, where A is the thickness of the bottom surface center of the bottle main body and Bmin is the minimum thickness of the bottom surface edge.

Next, a description will be given of a method of making the thickness A1 of the bottle bottom surface center greater than the average value of B11 to B14. As described above, through the blowing, the bottle bottom surface is formed by being expanded concentrically from the area 21*d* pinched between the pinch-off portions 31. At this time, the area 21*d* pinched between the pinch-off portions 31, namely the bottle bottom surface center area, is greater in thickness than the expanded edge area. Since the center and edge of the bottle bottom surface are different in expansion rate at the time of swelling the parison 4 by direct blowing, the center has a greater thickness. Accordingly, the center of the bottle bottom surface can be greater in thickness than the edge by, for example, using molds 3 that locate the edge more distant. Alternatively, by shaping the pinch-off portions 31 to perform pinching so that the center of the bottle bottom surface protrudes higher, the amount of the parison 4 can be large in the center and the center of the bottle bottom surface can be greater in thickness than the edge.

<Record of Collection>

For instance, the recycled plastic material used in the present embodiment is described as having only one record of collection. More specifically, the PCR material collected for the first time after being manufactured as a new product is described as an example of the recycled plastic material in use. However, the number of records of collection is not limited to one. A recycled plastic material having multiple records of collection may also be used. In this case, the possibility of increase in content of contaminant and impairment in impact absorbency is enlarged with an increase in number of records of collection. It is, therefore, preferable to change an allowable thickness according to the number of records of collection. Here, in a case when n is the number of records of collection, the thickness of the bottle bottom surface center is AHn, the average value of the thicknesses of the bottom surface edge is BHn_ave, and the minimum value of the bottom surface edge is BHn_min. At this time, AHn is greater than r1^(n−1) mm and AHn/BHn_ave is greater than r2^(n−1). Further, it is preferable to change the thickness according to the number of records of collection so that AHn/BHn_min is in a range less than 10×12^(n−1). Here, r1 and r2 are constants determined by the materials for the recycled plastic material, the content of contaminant, and the usage rates of the recycled materials. It is preferable that r1 and r2 each have a value from 1.01 to 2.00.

For example, on the assumption that r1 and r2 are each 1.25, in a case when the number of records of collection is two, AH2 is greater than 1.25 mm, BH2_ave is less than 0.8 times of AH2, and BH2_min is greater than 0.08 times of AH2. In a case when the number of records of collection is three, AH3 is greater than 1.56 mm, BH3_ave is less than 0.64 times of AH3, and BH3_min is greater than 0.06 times of AH3.

Further, although the recycled plastic materials described above as examples have the same number of records of collection such as one, two, or three, the recycled plastic materials having different numbers of records of collection may be used together. The materials having different numbers of records of collection may be treated as follows. It is assumed that a recycled plastic material having n1 records of collection and a recycled plastic material having n2 records of collection are mixed in rates of x1 and x2 (satisfying x1+x2=1). In this case, the number of records of collection n can be replaced with x1×n1+x2×n2. It is only required that the replaced value satisfy the above relationship. For example, in a case when materials whose numbers of records of collection are 1 and 2 are mixed in equal parts, the number of records of collection can be treated as 1.5 (=0.5×1+0.5×2). Similarly, even in a case when three or more materials are used together, it is only necessary to calculate the number of records of collection n=x1×n1+x2×n2+ . . . +xm×nm on the assumption that materials having n1, n2, . . . , nm records of collection are mixed in rates x1, x2, . . . , xm (the sum total is 1).

As described above, the present embodiment can reduce the possibility of a leakage of liquid from the bottle main body bottom surface and a burst of liquid from the nozzle opening at the time of drop/impact, which are caused by contaminants in the recycled plastic material. For example, in the present embodiment, the bottle main body bottom surface center has the large thickness A of 1 mm or more. Accordingly, even in a case when contaminants adhere to the bottle main body bottom surface center at the time of molding, the possibility of formation of a hole that establishes communication between inside and outside can be reduced.

Since the liquid storage bottle of the present embodiment can reduce the possibility of a leakage of liquid from the bottle main body bottom surface and a burst of liquid from the nozzle opening at the time of drop/impact even in the case of using the recycled plastic material, the use of the recycled plastic material for the liquid storage bottle can be facilitated. The use of the recycled plastic material for the liquid storage bottle can reduce the amount of virgin material for use and therefore has the potential to contribute to the achievement of a sustainable society, such as a decarbonized society/circular society. That is, the technologies described in this specification have the potential to contribute to the achievement of a sustainable society, such as a decarbonized society/circular society.

Further, since A/B>1 (the thickness B of the bottle main body bottom surface edge is less than the thickness A of the bottle main body bottom surface center), the bottle becomes easy to deform starting from the bottom surface edge at the time of drop/collision and the impact absorbency is thereby increased.

As described above, the liquid storage bottle with the reduced possibility of a leakage of liquid from the bottle main body 21 and a burst of liquid from the nozzle opening (inlet 22*a*) at the time of drop/collision can be provided.

Second Embodiment

In the first embodiment, an example of the bottle main body 21 having the bottom surface in the circular shape has been described. In the present embodiment, an example of the bottle main body 21 having the bottom surface in a substantially square shape will be described.

Figure 8A:
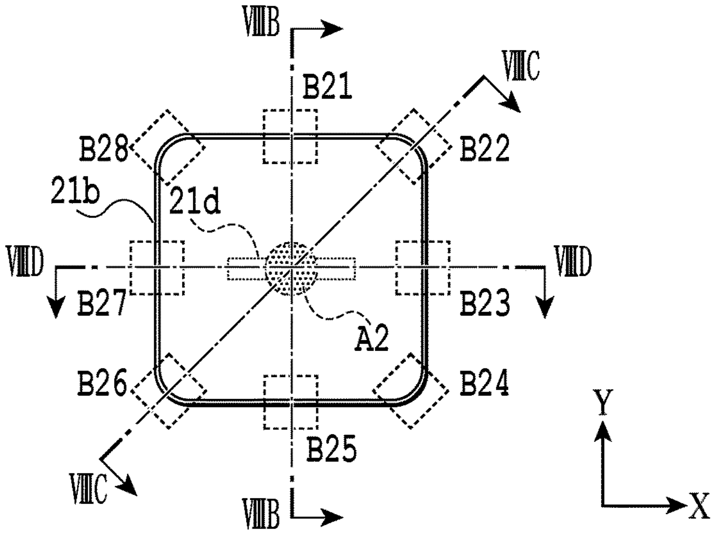
FIGS. 8A to 8D are diagrams illustrating the bottom surface of the bottle main body.
Figure 8B:
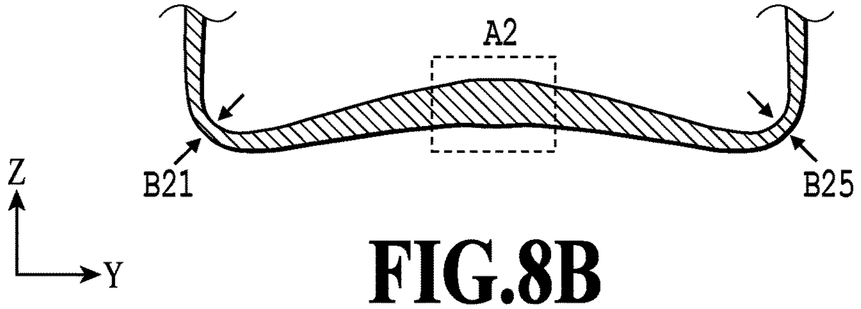
Figure 8C:
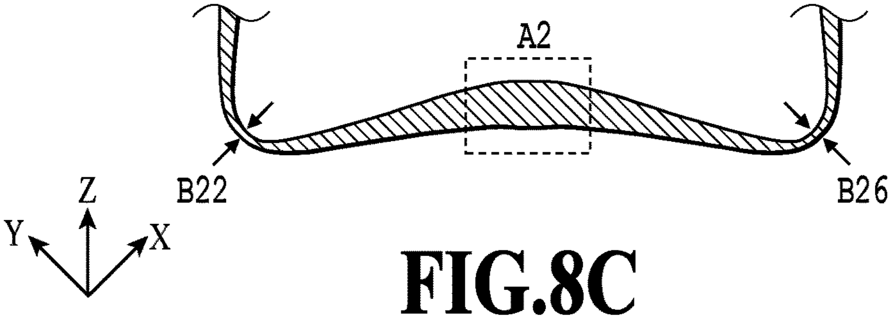
Figure 8D:
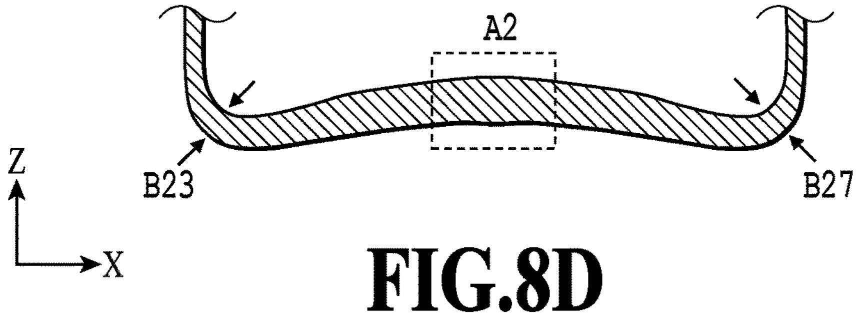

FIGS. 8A to 8D are diagrams illustrating the bottom surface of the bottle main body 21. FIGS. 8A to 8D are cross-sectional views of the bottom surface 21*b* in a case when the bottle main body has a square shape. FIG. 8A shows an XY cross section from above the bottle. FIG. 8B shows a VIIIb-VIIIb cross section (YZ cross section). FIG. 8C shows a VIIIc-VIIIc cross section (XY cross section in the 45° direction). FIG. 8D shows a VIIId-VIIId cross section (XZ cross section). Like the first embodiment, a direction in which the parison bottom portion 41 is pinched between the pinch-off portions 31 is the direction of the Y axis and an area pinched between the pinch-off portions 31 is denoted by 21*d*.

In the example of FIGS. 8A to 8D, the thickness of the bottle bottom surface center is A2 and the thicknesses of the bottle bottom surface edge are B21 to B28. B21 to B28 are set so that B21 is at 12 o'clock position on a ridge line formed by the bottle bottom surface and the side surface in FIG. 8A and B22 to B28 are arranged clockwise every 45°. That is, the positions of B21 to B28 are set as stated above on the ridge line formed by the bottle bottom surface and the side surface in the XY cross section (horizontal cross section) shown in FIG. 8A. In other words, the thicknesses are defined so that the bottle bottom surface edge has thicknesses B23 and B27 in the direction (X direction) of extension of the area 21*d* pinched between the pinch-off portions 31.

The thickness A2 of the bottle bottom surface center is defined as an average thickness in a circular area concentric with the bottle bottom surface and having a diameter that is one-fifth the interval between two opposing surfaces of the surfaces forming the bottle side surface. Each of the thicknesses B21 to B28 of the bottle bottom surface edge is a thickness of the most curved part of a corner portion formed by the bottle bottom surface edge and the lower part of the side surface (a corner portion of a cross section along the Z axis and the axis of the bottle diameter direction). Each of the thicknesses B21 to B28 of the bottle bottom surface edge is an average value in an area described below on the ridge line formed by the bottle bottom surface and the bottle side surface. B21 is described as an example. An area used for averaging processing for calculating B21 is a square area. The center of the square is at a point of intersection of a straight line extending from the center of the bottle bottom surface in the positive Y axis direction and the ridge line formed by the bottle side surface and the bottle bottom surface. The length of one side of the square is one-fifth the interval between two opposing surfaces of the surfaces forming the bottle side surface. Further, two opposing sides of the four sides of the square are arranged in parallel with the straight line extending from the center of the bottle bottom surface in the positive Y axis direction. For B22 to B28, square areas are similarly defined so that their centers are points of intersections of the straight line extending from the center of the bottle bottom surface in the positive Y axis direction and the ridge line formed by the bottle side surface and the bottle bottom surface in a case when the straight line is turned clockwise every 45° around the bottle bottom surface center. The other features are the same as those for B21 Incidentally, the above definition of the thicknesses is merely an example and the thicknesses are not limited to this example. The length of one side of the square may be changed or each thickness may be defined as a thickness in a rectangular area. Further, the shape is not limited to a rectangle and may be defined as a circle.

It is assumed that the thickness A2 of the bottle bottom surface center is greater than 1 mm and also greater than the average value of the thicknesses B21 to B28 of the bottle bottom surface edge. Further, a difference in thickness is set for B21 to B28 on the same grounds as in the first embodiment. More specifically, the thicknesses B22, B24, B26, and B28 near the corners of the bottom surface are set at the smallest value. Next, the rest of the thicknesses are set so that B23 and B27 are greater than B21 and B25. As described in the first embodiment, an example of a manufacturing method that enables such thicknesses is direct blow molding. As described in the first embodiment, by direct blow molding, the thickness is set so that it decreases with distance from the area 21*d* pinched between the pinch-off portions 31. In this case, from the viewpoint of strength, it is preferable that the minimum thicknesses B22, B24, B26, and B28 be equal to or greater than 0.1 times of the thickness A2 of the bottle bottom surface center.

Although the present embodiment describes an example of the bottle main body 21 having the bottom surface of the square shape, the shape of the bottom surface of the bottle main body 21 is not limited to this and may be a rectangular shape or any other polygonal shape. In this case, the thickness of the bottle bottom surface center only has to be greater than 1 mm and greater than the average value of the thicknesses of the bottle bottom surface edge. Incidentally, as described above, a difference in thickness can be provided for the thickness of the bottle bottom surface edge according to the distance from the area 21*d* pinched between the pinch-off portions 31.

Third Embodiment

In the first and second embodiments, the relationship between the thickness of the bottle bottom surface center and the thickness of the bottle bottom surface edge has been described. In the present embodiment, a relationship between the thickness of the bottle side surface in the center in the height direction and the thickness of the bottle bottom surface edge will be described. The bottle bottom surface may have any shape, but the shape is described here as a circular shape like the first embodiment.

Figure 9:
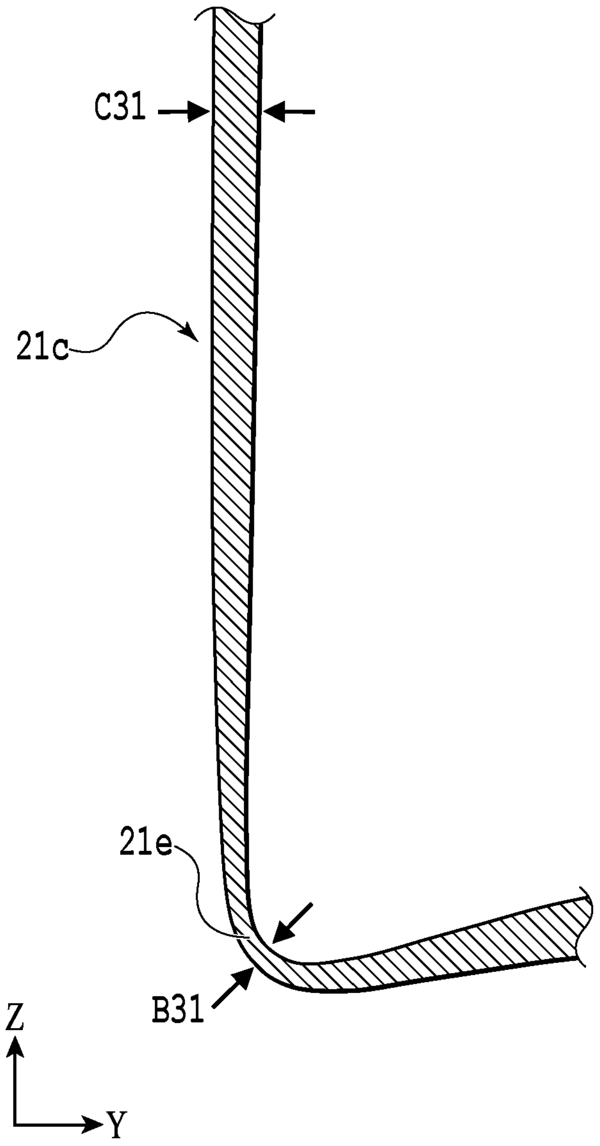
FIG. 9 is a cross-sectional view of a bottle main body side surface.

FIG. 9 is a cross-sectional view of a bottle main body side surface 21*c*. The cross section shown in FIG. 9 is a YZ cross section. Like the example described in the first embodiment, the Y axis indicates the direction in which the parison bottom portion 41 is pinched between the pinch-off portions 31. The thickness of the bottle bottom surface edge is denoted by B31 and the thickness of the bottle side surface in the center in the height direction is denoted by C31. As described in the first embodiment, the thickness B31 of the bottle bottom surface edge along the Y axis is the minimum thickness in the bottle bottom surface edge. The definition of the thickness B31 of the bottle bottom surface edge is the same as that of the example described in the first or second embodiment. The definition of the thickness C31 of the bottle side surface in the center in the height direction is also in conformity with the definition described in the first or second embodiment. That is, it can be an average value of thicknesses in a predetermined square shape in a vertical cross section (XZ cross section), like the example described in the first or second embodiment.

In the present embodiment, the thickness B31 of the bottle bottom surface edge is set so that it is 0.2 to 1.0 times of the thickness C31 of the bottle side surface in the center in the height direction. That is, the side surface of the bottle main body is configured to satisfy $1<C/Bmin<5$, where Bmin is the minimum thickness of the bottom surface edge and C is the thickness of the side surface of the bottle main body in the center in the height direction positioned above the bottom surface edge in the height direction. It is preferable that the thickness B31 of the bottle bottom surface edge be 0.4 to 1.0 times of the thickness C31 of the bottle side surface in the center in the height direction. Such a range of thickness makes the bottle side surface easy to deform starting from the bottle bottom surface edge 21*e* at the time of drop/collision. Accordingly, the bottle main body 21 is more likely to absorb the impact of collision. Further, since the thickness C31 of the bottle side surface in the center in the height direction is greater than the thickness B31 of the bottle bottom surface edge, the bottle can have sufficient strength to resist buckling deformation under a load in the vertical direction of the bottle.

Examples

FIG. 10 is a diagram showing results of examples and comparative examples. The examples will be described below. FIG. 10 shows results of thickness measurement, thickness rates, and evaluation results of leakage and drop/collision in Examples 1 to 4 of bottle main bodies 21 different in volume corresponding to the first embodiment and Comparative Examples 1 to 3 irrespective of the embodiments.

Thicknesses were measured in bottle side surface centers C11 and C13 in addition to the bottle bottom surface center A1 and the bottle bottom surface edges B11 to B14 shown in FIGS. 7A to 7C. The thicknesses of the bottle side surface centers C11 and C13 are thicknesses of the bottle side surface in the center in the height direction positioned above the bottle bottom surface edges B11 and B13, respectively. Bave is the average value of B11 to B14 and Bmin is the minimum value of B11 to B14.

Leakage and drop/collision evaluations were carried out with a predetermined amount of liquid stored in the liquid storage bottle 2 using each bottle main body 21. In the leakage evaluation, the bottle was preserved in a high-temperature environment for a certain period and, if even a small amount of liquid oozed from the center of the bottom surface of the bottle after the preservation, the bottle was ranked NG (no good). In the drop/collision evaluation, the bottle was dropped from a height of 160 cm to come into collision, the cap was then opened, and if even a small amount of inside liquid adhered to the periphery of the nozzle tip, the bottle was ranked NG.

In Examples 1 to 4, the results of the leakage and drop/collision evaluations were both OK. On the other hand, in Comparative Example 1 with the thickness of the bottle bottom surface center A1 of 1 mm or less and A/Bave of 1 or less, the results of the leakage and drop/collision evaluations were both NG. Further, in Comparative Example 2 with the thickness of the bottle bottom surface center A1 greater than 1 mm and A/Bave of 1 or less, the leakage evaluation result was OK and the drop/collision evaluation result was NG. Further, in Comparative Example 3 with the thickness of the bottle bottom surface center A1 of 1 mm or less and A/Bave greater than 1, the leakage evaluation result was NG and the drop/collision evaluation result was OK.

OTHER EMBODIMENTS

<Configuration of Liquid Supply Unit (Nozzle)>

In the first to third embodiments, the configuration of the bottle main body 21 has been described mainly focusing on its thickness. The following description will explain a configuration example of the nozzle 22, which is a liquid supply unit in the liquid storage bottle 2.

<Valve Spring Configuration>

Figure 11A:
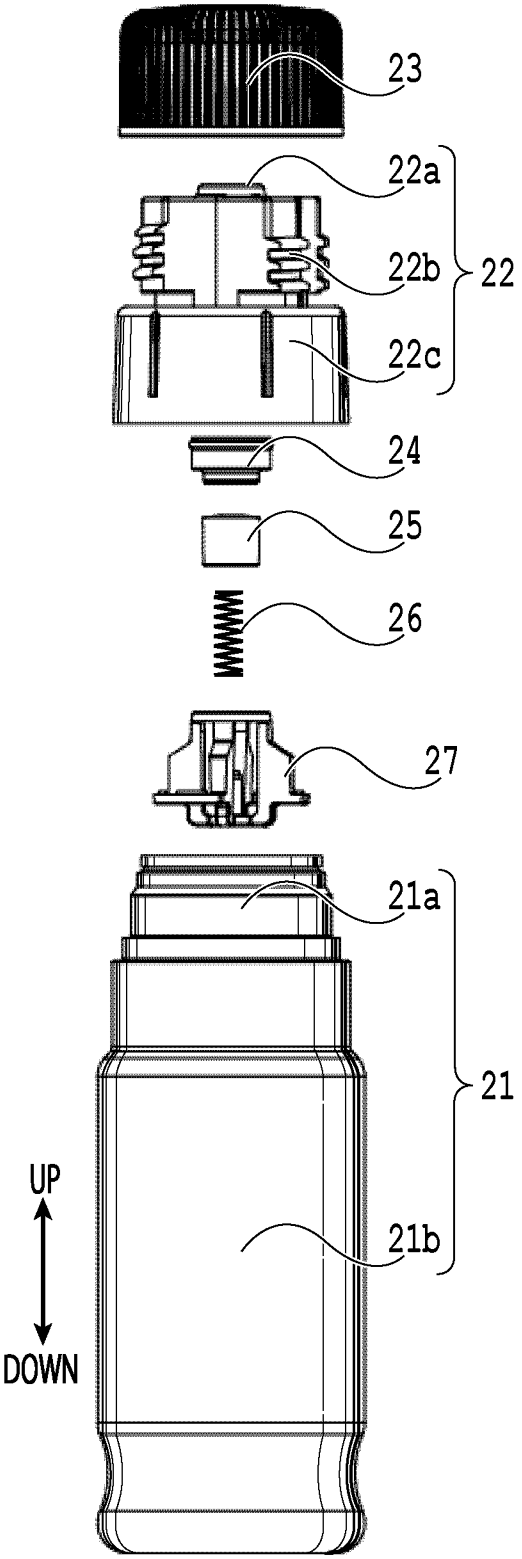
FIGS. 11A and 11B are diagrams showing details of an example of components of the liquid storage bottle.
Figure 11B:
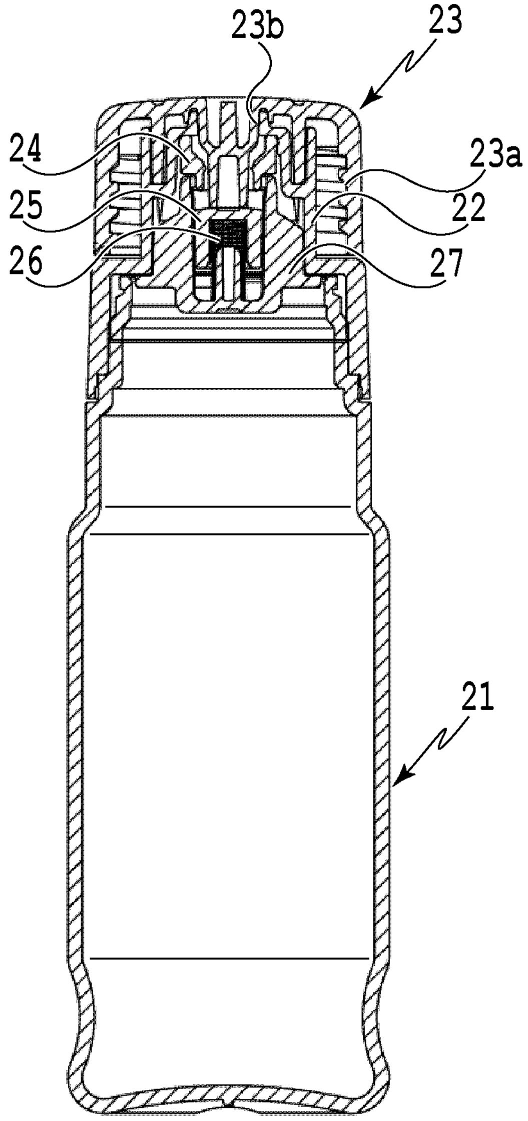

FIGS. 11A and 11B are diagrams showing more details of an example of components of the liquid storage bottle 2. FIG. 11A is a diagram showing an example of a component configuration diagram of the liquid storage bottle 2 shown in FIG. 4. FIG. 11B is a cross-sectional view in a coupled state of the component configuration diagram of the liquid storage bottle 2 shown in FIG. 11A. The nozzle 22 comprises therein a seal 24 with an opening, a valve 25 which opens and closes the opening of the seal 24, a spring 26 which biases the valve 25, and a holder 27 which fixes the spring 26.

In a case when liquid is supplied from the liquid storage bottle 2 to the liquid tank 12, the inlet 122 of the liquid tank 12 is inserted into the opening of the nozzle 22 of the liquid storage bottle 2. The nozzle 22 of the liquid storage bottle 2 has a recessed portion to engage with a protruding portion provided in the liquid ejection apparatus 1 and the position of the liquid storage bottle 2 is determined with the insertion of the inlet 122 into the opening of the nozzle 22. Liquid inside the liquid storage bottle 2 is supplied to a chamber of the tank main body 121 through the inlet 122 by a water head difference.

Figure 12A:
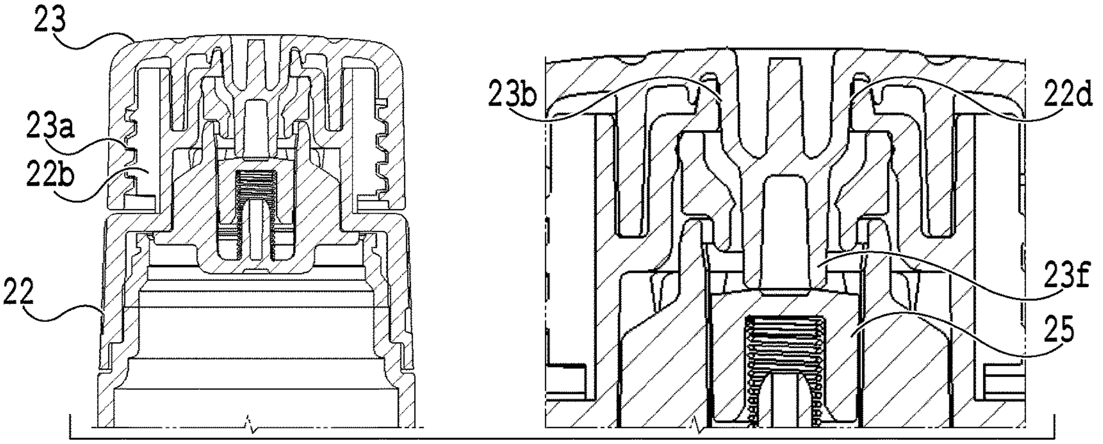
FIGS. 12A to 12C are diagrams illustrating sealing units.
Figure 12B:
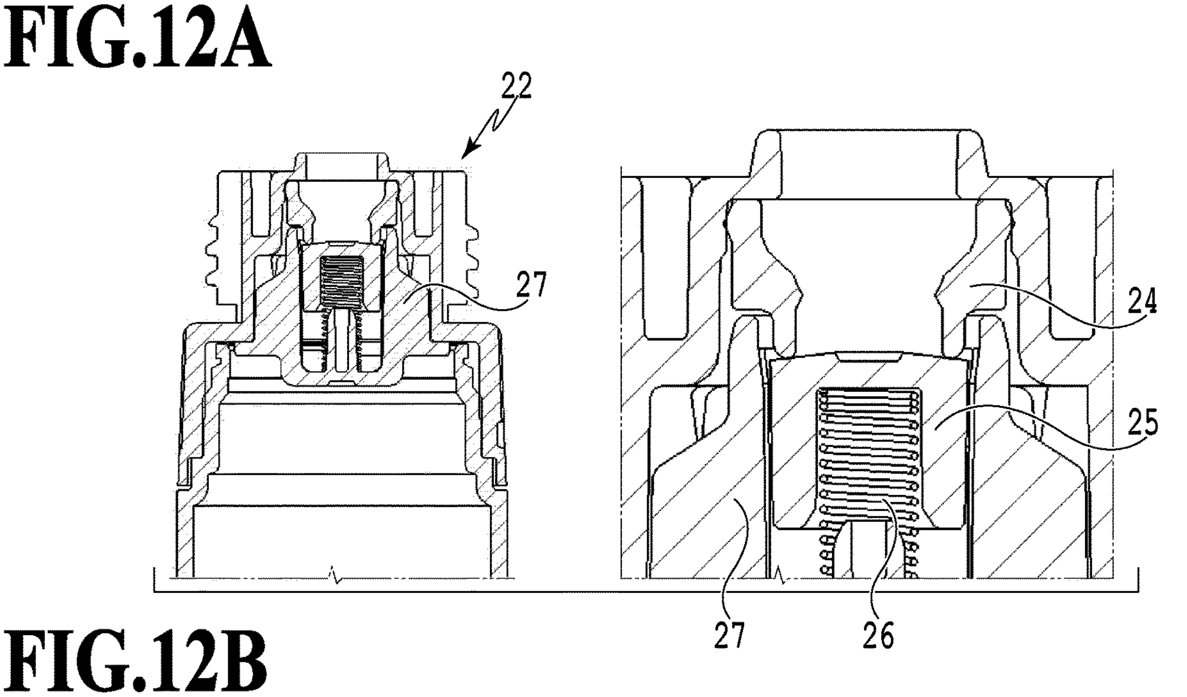
Figure 12C:
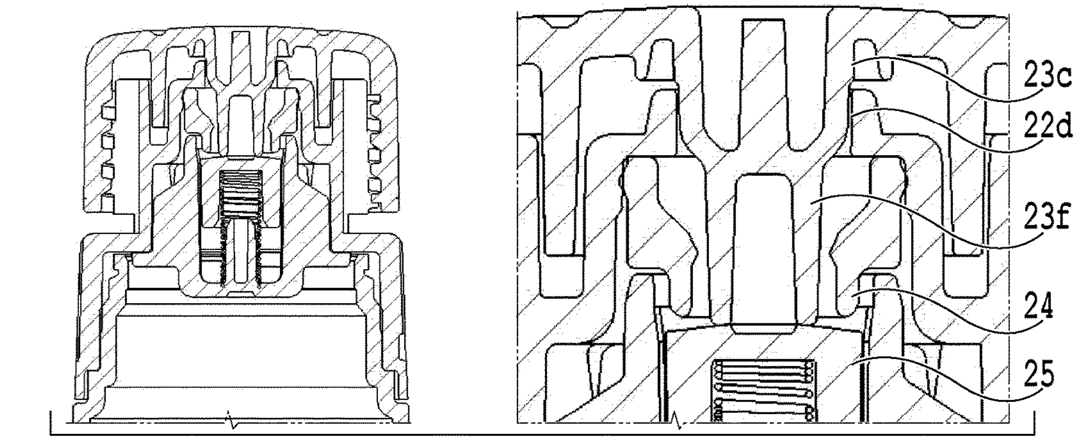

The liquid storage bottle 2 has two sealable places (hereafter referred to as sealing units). FIGS. 12A to 12C are diagrams illustrating the sealing units. In the first sealing unit, as shown in FIG. 12A, the bottle is sealed by engagement between the cap 23 and the nozzle 22. In the second sealing unit, as shown in FIG. 12B, the bottle is sealed by a valve structure in the nozzle 22. Each of the sealing units will be described below.

The first sealing unit will be described with reference to FIG. 12A. FIG. 12A is a cross-sectional view of the top of the liquid storage bottle 2 with the cap 23 mounted on the nozzle 22 and shows its enlarged view together. The first sealing unit is a place where a cap seal portion 23*b* of the cap 23 is engaged with a nozzle seal portion 22*d*, which is a part of the inlet 22*a* of the nozzle 22, by mounting the cap 23 on the nozzle 22. As an example of a method of mounting the cap 23 on the nozzle 22, the cap 23 can be screwed into the nozzle 22. More specifically, as shown in FIGS. 11A, 11B, and 12A, the screwing method may use the nozzle thread portion 22*b* having a male thread structure on the outer surface of the nozzle 22 and the cap thread portion 23*a* having a female thread structure on the inner surface of the bottom of the cap 23. However, the method may use the cap 23 with a male thread portion and the nozzle 22 with a female thread portion instead.

Further, as the method of mounting the cap 23 on the nozzle 22, a place for engagement other than the sealing unit may be provided instead of screwing. For example, an outer fitting lid may be configured so that the cap 23 fits onto the outer surface of the nozzle 22, or an inner fitting lid may be configured so that the cap 23 fits onto the inner surface of the nozzle 22.

The second sealing unit will be described with reference to FIG. 12B. FIG. 12B is a cross-sectional view of the top of the liquid storage bottle 2 without the cap 23 mounted and shows its enlarged view together. The second sealing unit is a place for a liquid stop valve structure (valve structure) provided inside the nozzle 22 of the liquid storage bottle 2. As shown in FIG. 12B, the tip (upper end) of the nozzle 22 is provided with the seal 24, which is an orifice portion having an opening to insert the inlet 122. The valve 25, which is a valve element of a liquid stop valve, is biased toward the opening by the spring 26, whereby a gap between the seal 24 and the valve 25 is closed and the liquid storage bottle 2 is sealed. In this example, the spring 26 is used as a biasing mechanism and the holder 27 fixed in the inner space of the nozzle 22 holds the spring 26. The seal 24 is formed of a flexible member such as a rubber or elastomer.

By the above liquid stop valve structure, the valve 25 is biased against the opening of the seal 24 by the spring 26. Thus, even in a case when the cap 23 is removed from the nozzle 22, the inside of the liquid storage bottle 2 can be kept sealed. In a case when liquid is supplied from the liquid storage bottle 2 to the liquid tank 12, the valve 25 is opened by inserting the inlet 122 into the nozzle 22 through the opening of the seal 24. As described above, liquid inside the liquid storage bottle 2 is supplied to the chamber of the tank main body 121 through the inlet 122 by a water head difference.

In this example, the two sealing units are configured to be opened at the same time temporarily in a case when the cap 23 is opened by being removed from the nozzle 22 and the cap 23 is closed by being mounted on the nozzle. The inside of the liquid storage bottle 2 can thus communicate with the atmosphere and an internal pressure of the liquid storage bottle 2 can be equal to the ambient pressure. This will be described below in detail.

First, while the cap 23 is closed, the first sealing unit is sealed as shown in FIG. 12A. On the other hand, in the second sealing unit, a projection 23*f* provided in the cap 23 is pressed in a direction opposite to a direction of a bias applied to the valve 25 by the closing of the cap 23, whereby a gap is formed between the seal 24 and the valve 25. In this manner, the second sealing unit is opened in FIG. 12A. In short, while the cap 23 is closed, the first sealing unit is sealed and the second sealing unit is opened.

FIG. 12C is a cross-sectional view of the top of the liquid storage bottle 2 in a case when the cap 23 starts opening from the state of being mounted on the nozzle 22 shown in FIG. 12A, and shows its enlarged view together. From the closed state shown in FIG. 12A, the cap 23 is moved upward with the opening of the cap as shown in FIG. 12C. With this movement of the cap 23, the cap seal portion 23*b* is separated from the nozzle seal portion 22*d* and the first sealing unit is opened. While the first sealing unit is being opened, the projection 23*f* provided in the cap 23 is still positioned to press the valve 25 as shown in FIG. 12C. That is, the second sealing unit remains open. Accordingly, as shown in FIG. 12C, the second sealing unit can be opened simultaneously with the opening of the first sealing unit. After that, the cap 23 is further moved upward, and with this movement of the cap 23, the projection 23*f* is completely separated from the valve 25 and the second sealing unit is sealed as shown in FIG. 12B. Incidentally, in a case when the opened cap 23 is closed, the valve 25 is pressed by the projection 23*f* of the cap 23 with the movement of the cap 23, whereby the second sealing unit is opened. At this time, the first sealing unit is yet to be sealed and thus remains open. After that, the first sealing unit is sealed by closing the cap 23. Incidentally, the first sealing unit and the second sealing unit being opened at the same time means that they are opened substantially at the same time. In a case when the second sealing unit is opened in conjunction with the opening of the first sealing unit, they can be said to be opened at the same time.

By the configuration described above, in a case where the cap 23 is opened, the first sealing unit and the second sealing unit are temporarily opened at the same time. Thus, the inside of the liquid storage bottle 2 can communicate with the atmosphere and the internal pressure of the liquid storage bottle 2 can be equal to the ambient pressure. As a result, in a case when the cap 23 is opened to refill the tank main body 121 with liquid from the liquid storage bottle 2, a spurt of liquid caused by a rise in internal pressure of the liquid storage bottle 2 can be suppressed. Further, liquid can be suppressed from flooding from the tank main body 121. Further, since the second sealing unit maintains the sealed state of the inside of the liquid storage bottle 2 even in a case when the cap 23 is opened, a leakage of liquid can be suppressed even in a case when the liquid storage bottle 2 is inverted.

<Slit Valve Configuration>

Figure 13A:
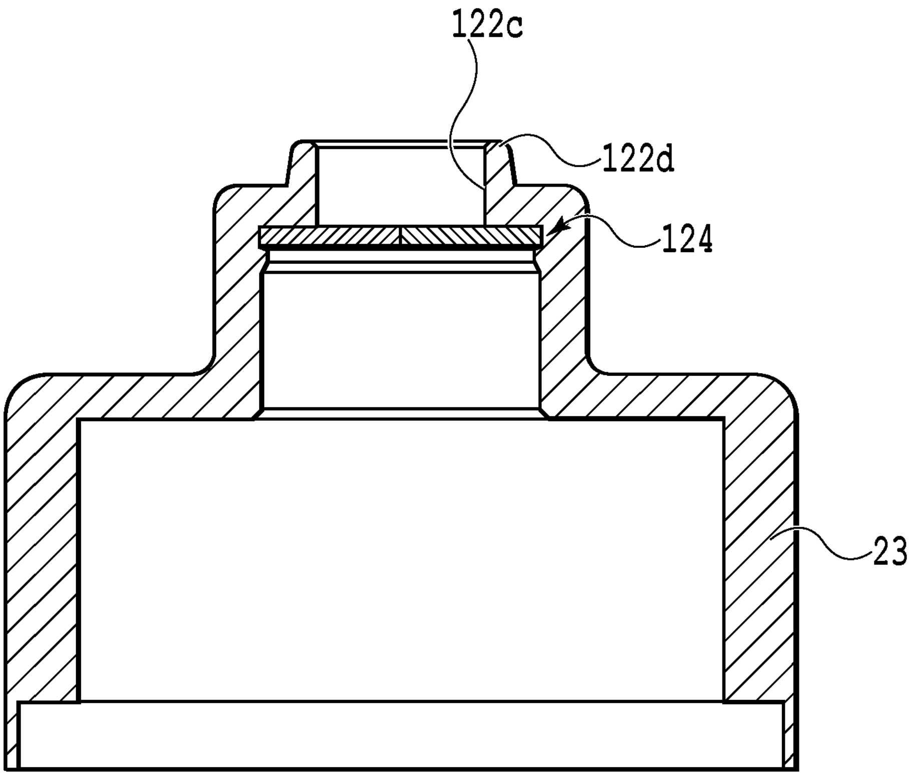
FIGS. 13A and 13B are diagrams illustrating a nozzle of a slit valve type.
Figure 13B:
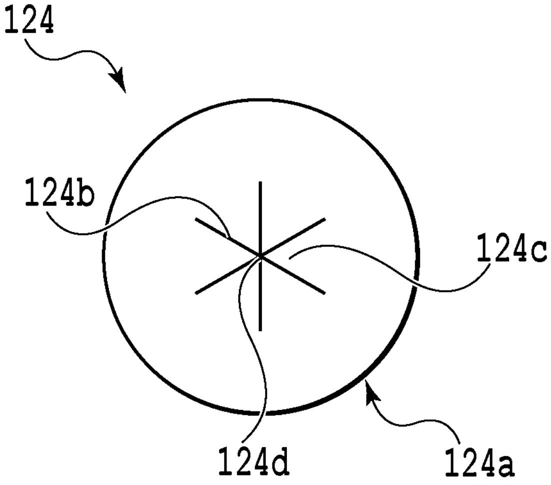
Figure 14:
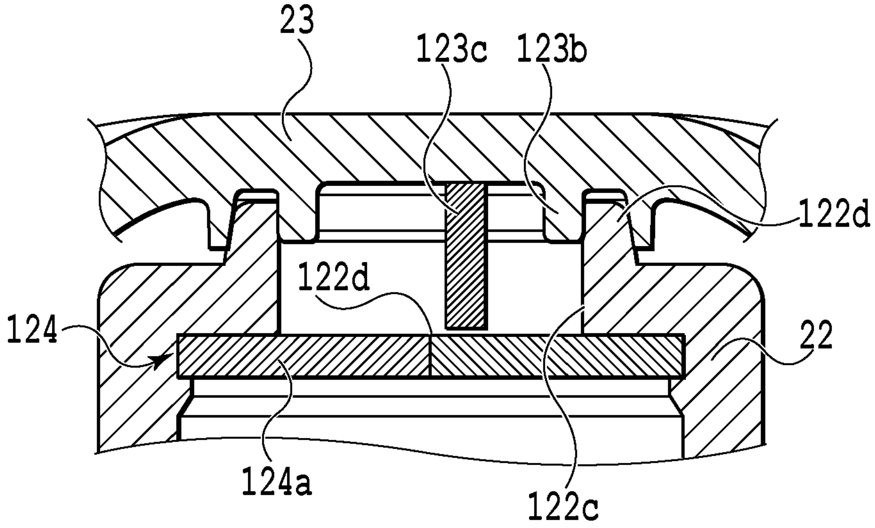
FIG. 14 is an enlarged cross-sectional view of a nozzle and a cap.

FIGS. 13A and 13B are diagrams illustrating the nozzle 22 of a slit valve type. FIG. 13A is a cross-sectional view of the nozzle of this example and FIG. 13B is a plan view of a slit valve provided in the nozzle of this example. FIG. 14 is an enlarged cross-sectional view of the nozzle 22 and cap of this example.

The nozzle 22 comprises an inlet 122*c* which injects liquid and a nozzle seal portion 122*d* formed by a ring-shaped rib provided along the circumference of the inlet 122*c*. The inlet 122*c* is provided with a slit valve 124 that opens and closes according to the internal pressure of the liquid storage bottle 2. The slit valve 124 comprises a valve element 124*a* made of a flexible material and three slits 124*b* formed in the valve element 124*a* to intersect with one another and can seal the inlet 122*c* in a closed state. In the valve element 124*a*, six divided pieces 124*c* are formed by the three slits 124*b*. Incidentally, the number of slits 124*b* is not limited to this and may be two or four or more. In this case, on the assumption that the number of slits 124*b* is n, it is preferable that the slits 124*b* be formed to be second-fold rotationally symmetric with respect to the center of the circular valve element 124*a* as illustrated. This enables the divided pieces 124*c* to be equally opened and the liquid inside the liquid storage bottle 2 to be smoothly injected.

A bottom surface (a surface facing the inlet 122*c*) of the cap 23 is provided with a cap seal portion 123*b* formed by a ring-shaped rib and a projection 123*c* projecting toward the slit valve 124. The cap seal portion 123*b* functions as a sealing means that seals the inlet 122*c* together with the nozzle seal portion 122*d* by fitting into the nozzle seal portion 122*d* in a case where the cap 23 is mounted on the nozzle 22. While the inlet 122*c* is sealed with the cap seal portion 123*b* and the nozzle seal portion 122*d*, the tip of the projection 123*c* faces the valve element 124*a* of the slit valve 124 at a position laterally distant from an intersection point 124*d* of the slits 124*b*. The lateral direction corresponds to a radial direction of the nozzle 22. According to this configuration of the projection 123*c*, in a case when the internal pressure of the liquid storage bottle 2 is higher than the ambient pressure at the time of opening of the cap 23 as will be described later, the internal pressure can be released. The projection 123*c* is provided integrally with the cap 23 in this example but may be provided separately from the cap 23.

Figure 15A:
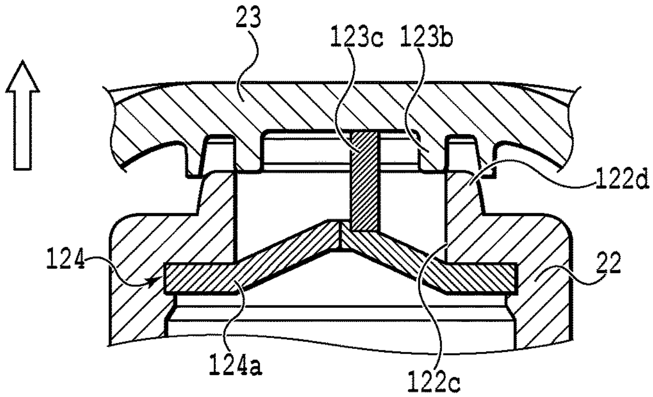
FIGS. 15A to 15D are diagrams showing a relationship between a slit valve and a projection.
Figure 15B:
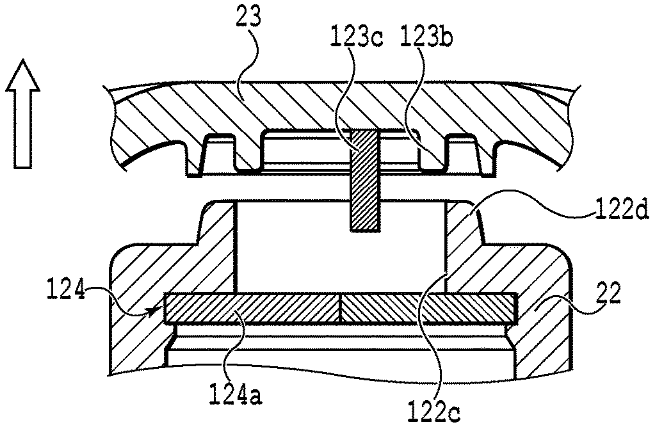

FIGS. 15A to 15D are diagrams showing a relationship between the slit valve 124 and the projection 123*c*. FIGS. 15A and 15B are cross-sectional views showing a relationship between the slit valve and the projection at the time of opening of the cap. While the cap 23 is mounted on the nozzle 22 and the inlet 122*c* is sealed, as described above, the projection 123*c* faces the valve element 124*a* at the position laterally distant from the intersection point 124*d* of the slits 124*b* and does not contact the valve element 124*a*. Here, in a case when the cap 23 starts opening, the cap seal portion 123*b* and the nozzle seal portion 122*d* are moved out of engagement and the inlet 122*c* is unsealed. At this time, in a case when the internal pressure of the liquid storage bottle 2 is higher than the ambient pressure, the valve element 124*a* of the slit valve 124 is deformed to swell outward under the internal pressure of the liquid storage bottle 2 as shown in FIG. 15A. In a case when the swollen valve element 124*a* contacts the projection 123*c*, the slits 124*b* are opened, the internal pressure of the liquid storage bottle 2 is released, and the swelling of the valve element 124*a* is eliminated. After that, upon the removal of the cap 23, the slits 124*b* are closed and the inlet 122*c* is sealed again as shown in FIG. 15B. In a case when liquid is injected from the liquid storage bottle 2 to the liquid tank 12, a pressure difference between the inside and outside of the liquid storage bottle 2 has been removed and the inlet 122*c* is sealed. Thus, in a case when the bottle main body 21 is just inversed, a pressure necessary for opening of the slits 124*b* can be suppressed from acting on the slit valve 124 and a leakage of liquid from the inlet 122*c* can be suppressed.

Figure 15C:
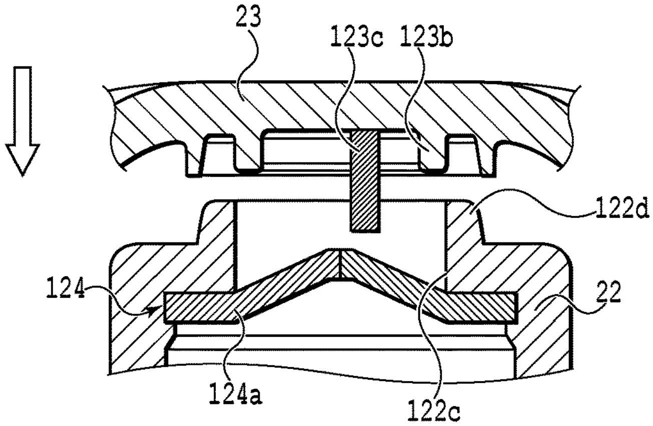
Figure 15D:
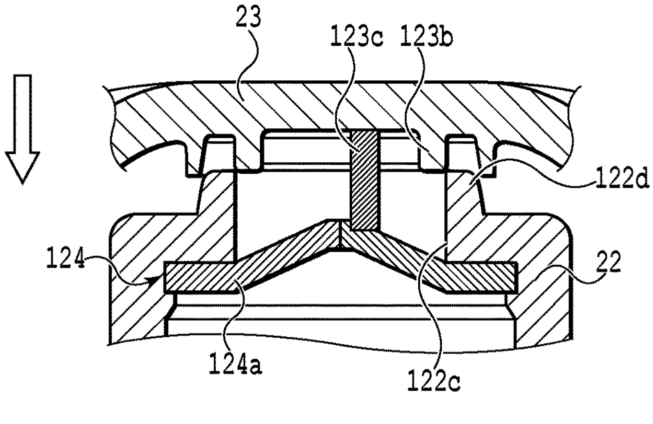

On the other hand, FIGS. 15C and 15D are cross-sectional views showing a relationship between the slit valve and the projection at the time of closing of the cap. In a case when the internal pressure of the liquid storage bottle 2 rises while the cap 23 is not mounted on the nozzle 22, the valve element 124*a* of the slit valve 124 is deformed to swell outward as shown in FIG. 15C. Here, in a case when the cap 23 starts closing, as shown in FIG. 15D, the projection 123*c* contacts the swollen valve element 124*a* before the cap seal portion 123*b* fits into the nozzle seal portion 122*d*. Accordingly, the slits 124*b* are opened and the internal pressure of the liquid storage bottle 2 is released. After the swelling of the valve element 124*a* is eliminated, the slits 124*b* are closed and the inlet 122*c* is sealed. In a case when the closing of the cap 23 is further continued, the cap seal portion 123*b* fits into the nozzle seal portion 122*d* and the inlet 122*c* is sealed. At this time, since the swelling of the valve element 124*a* has been eliminated, the projection 123*c* faces the valve element 124*a* at the position laterally distant from the intersection point 124*d* of the slits 124*b* and does not contact the valve element 124*a*.

According to the above configuration, even in the case of a rise in internal pressure of the liquid storage bottle 2, the projection 123*c* contacts the slit valve 124 at the time of opening/closing of the cap 23, which allows the internal pressure to escape to the outside. Incidentally, the length of the projection 123*c* is not particularly limited and can be set at an optimal length according to the amount of actual deformation of the valve element 124*a* caused by a rise in internal pressure of the liquid storage bottle 2. For example, in a case when the amount of deformation of the valve element 124*a* is relatively small, the tip of the projection 123*c* may contact the valve element 124*a* to the extent that the valve element 124*a* is not deformed while the inlet 122*c* is sealed with the cap seal portion 123*b* and the nozzle seal portion 122*d*.

Incidentally, for just bringing the projection 123*c* into contact with the swollen valve element 124*a*, a configuration shown in FIG. 14 is also considered. That is, it is also considered that the tip of the projection 123*c* faces the intersection point 124*d* of the slits 124*b* while the cap 23 is mounted on the nozzle 22 (while the inlet 122*c* is sealed). However, in this case, depending on the thickness of the projection 123*c*, the projection 123*c* may be inserted into the slits 124*b* near the intersection point 124*d* at the time of swelling of the valve element 124*a*. Further, even in a case when the projection 123*c* is thus inserted, the slits 124*b* may be kept closed. As a result, even in a case when the projection 123*c* contacts the swollen valve element 124*a*, there is a possibility that the internal pressure of the liquid storage bottle 2 is not released. From this viewpoint, it is preferable that the tip of the projection 123*c* face the valve element 124*a* of the slit valve 124 at the position laterally distant from the intersection point 124*d* of the slits 124*b* while the inlet 122*c* is sealed.

<Dual-hole Configuration>

Figure 16A:
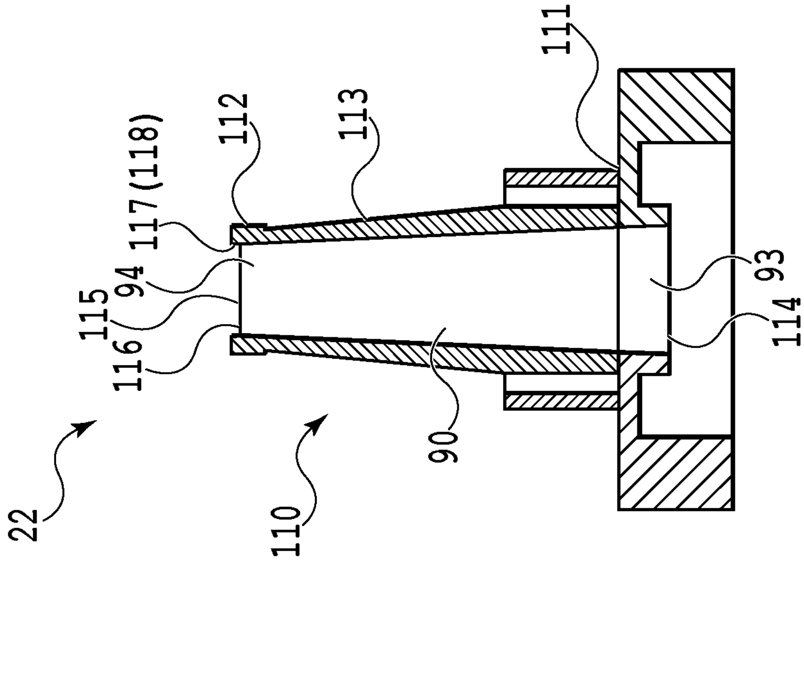
FIGS. 16A and 16B are diagrams illustrating a nozzle of a dual-hole configuration.
Figure 16B:
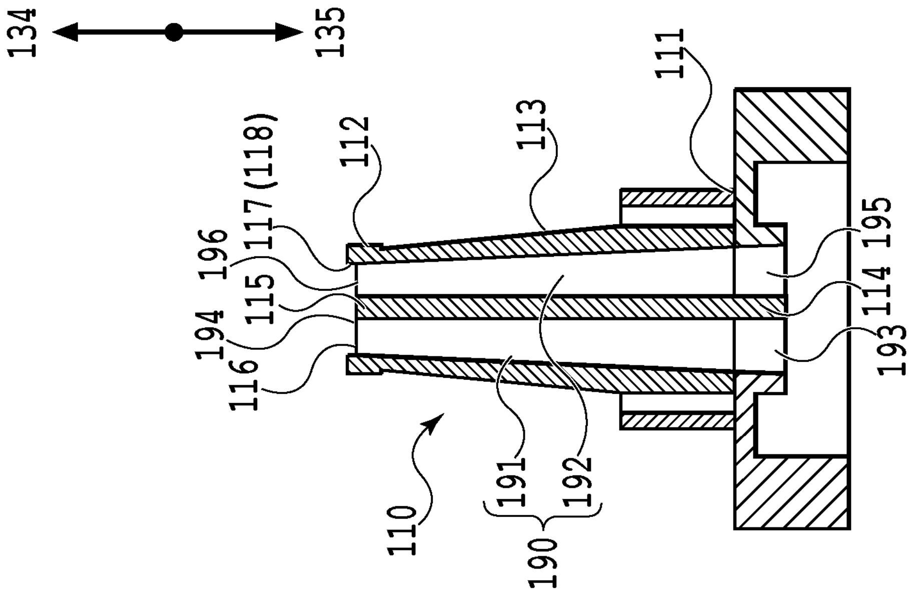

FIGS. 16A and 16B are diagrams illustrating a nozzle of a dual-hole configuration. FIGS. 16A and 16B are cross-sectional views of the nozzle 22. As shown in FIG. 16A, a nozzle portion 110 protrudes in a first orientation 134 from an outer surface of a bottom wall 111 of the nozzle 22. That is, while the nozzle 22 is mounted on the bottle main body 21, the nozzle portion 110 protrudes in the first orientation 134 from the bottle main body 21 through the nozzle 22. The nozzle portion 110 may protrude from the bottom wall 111 in the second orientation 135 as well as the first orientation 134. In this case, the nozzle is provided to penetrate the bottom wall 111.

The nozzle portion 110 has a substantially-cylindrical shape. The nozzle portion 110 has an outer peripheral surface 112 having a circular cross section. An outer peripheral surface 113 which is a part of the outer peripheral surface 112 has a tapered shape and is sloped so that a diameter of an outer circle decreases in the first orientation 134 from the bottom wall 111. This shape enables smooth operation in a case when the nozzle portion 110 is inserted into the tank from a distal end distant from the bottle main body 21. However, the diameter of the outer circle of the nozzle portion 110 may be the same from the bottom wall 111 to the tip and the outer peripheral surface may extend in the vertical direction. Further, the shape may be a shape other than the cylinder such as a quadrangular prism.

The nozzle portion 110 comprises a flow path 90 for flow of ink or gas. The flow path 90 penetrates the nozzle 22 in the first orientation 134. The flow path 90 extends in the first orientation 134 but is not limited to this and may be curved. The shape of a cross section of the flow path 90 may be a circle or a shape other than a circle. While the nozzle 22 is mounted on the bottle main body 21, one end of the flow path 90 communicates with the bottle main body 21 through an opening 93. The other end of the flow path communicates with the outside of the nozzle 22 through an opening 94 at a distal end of the nozzle. The opening 93 has a circular shape. However, the opening 93 may have a shape other than a circle. Further, the opening 93 may be formed at any position at a proximal end portion of the nozzle portion 110 and the position is not limited to a proximal surface 114. The opening 94 is formed in a distal surface 115 forming an end of the nozzle portion 110 in the first orientation 134. The opening 94 has a circular shape. However, the opening 94 may have a shape other than a circle.

As shown in FIG. 16B, the nozzle portion 110 may comprise two flow paths 190, a first flow path 191 and a second flow path 192. The first flow path 191 and the second flow path 192 may be either equal or different in length in the direction of ink flow. Further, the first flow path 191 and the second flow path 192 may be either equal or different in cross-sectional shape and area. Further, the number of flow paths 190 may be more than two. In a case when a plurality of flow paths 190 are provided, the flow paths 190 may be either equal or different in length and shape. In a case when the nozzle portion 110 comprises two flow paths 190, openings 193 and 195 at the proximal end portion are formed on the same plane. However, the openings may be formed on different planes. A first opening 194 and a second opening 196 are formed in the distal surface 115 forming the end of the nozzle portion 110 in the first orientation 134. However, the first opening 194 and the second opening 196 may be formed at any position at a distal end portion of the nozzle portion 110 and the position is not limited to the distal surface 115. The first opening 194 and the second opening 196 have a circular shape. However, the shape of the first opening 194 and second opening 196 may be a shape other than a circle.

The distal end portion of the nozzle portion 110 is a portion of the nozzle portion 110 formed by, for example, the distal surface 115 and the outer peripheral surface 112. The nozzle portion 110 has a recessed portion 116 on its outer peripheral surface 112. The recessed portion 116 is defined by the distal surface 115 and an inner peripheral surface 118 (one surface of a side surface) of an annular rib 117 protruding in the first orientation 134 from an outer edge of the distal surface 115. That is, the distal surface 115 is recessed from a distal end of the nozzle portion 110 (a distal end of the annular rib 117). The inner peripheral surface 118 extends from the distal surface 115 to the outer edge of the distal surface 115 in the first orientation 134. That is, the inner peripheral surface 118 extends in the first orientation 134 while sloping to enlarge the diameter of the recessed portion 116. However, the inner peripheral surface 118 may extend in the first orientation 134 without sloping. Further, the nozzle portion 110 does not have to comprise the recessed portion 116. In other words, the distal end portion of the nozzle portion 110 does not have to be recessed.

OTHER EMBODIMENTS

In the examples described in the above embodiments, the serial type liquid ejection apparatus that ejects liquid from the liquid ejection head according to the reciprocal movement of the carriage has been described as an example of the liquid ejection apparatus for which the liquid storage bottle is used. However, the use is not limited to this and the liquid storage bottle may be used for a so-called full line type liquid ejection apparatus comprising a liquid ejection head in which ejection openings are formed in a width direction of a print medium.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An ink storage bottle comprising:

a bottle main body;

a nozzle configured to supply ink externally; and a cap configured to cover the nozzle, wherein the bottle main body contains a recycled plastic material or a resin material obtained by mixing recycled plastic materials, A>1 mm and A/B>1 are satisfied, where A is a thickness of a bottom surface center of the bottle main body and B is an average thickness of a bottom surface edge of the bottle main body, and B is the average thickness measured at a plurality of positions, with at least some of the thicknesses used to calculate B being different from each other.

2. The ink storage bottle according to claim 1, wherein the recycled plastic material is one of PP, PE, PET, PVC, and PS or a mixture of two or more of PP, PE, PET, PVC, and PS.

3. The ink storage bottle according to claim 1, wherein a seam is formed on a bottom surface of the bottle main body.

4. The ink storage bottle according to claim 1, wherein a thickness of a bottom surface of the bottle main body satisfies 1<A/Bmin<10, where Bmin is a minimum thickness of the bottom surface edge.

5. The ink storage bottle according to claim 4, wherein a side surface of the bottle main body satisfies 1<C/Bmin<5, where C is a thickness of the side surface of the bottle main body in a center in a height direction positioned above the bottom surface edge of the minimum thickness in the height direction.

6. The ink storage bottle according to claim 1, wherein a cross section parallel to a bottom surface of the bottle main body is a circle.

7. The ink storage bottle according to claim 1, wherein a cross section parallel to a bottom surface of the bottle main body has a polygonal shape.

8. The ink storage bottle according to claim 1, wherein the bottle main body contains 5 wt % or more of recycled plastic material.

9. The ink storage bottle according to claim 1, wherein the recycled plastic material is a post-consumer material.

10. The ink storage bottle according to claim 1, wherein the recycled plastic material is a pre-consumer material.

11. A method of manufacturing an ink storage bottle that includes a bottle main body, a nozzle configured to supply ink externally, and a cap configured to cover the nozzle, the method comprising:

pinching a parison containing a recycled plastic material or a resin material obtained by mixing recycled plastic materials; and forming the bottle main body by blowing air into the parison, wherein A>1 mm and A/B>1 are satisfied, where A is a thickness of a bottom surface center of the formed bottle main body and B is an average thickness of a bottom surface edge of the bottle main body, and wherein B is the average thickness measured at a plurality of positions, with at least some of the thicknesses used to calculate B being different from each other.

12. A liquid storage container comprising:

an ink containing portion for containing ink, wherein the ink containing portion contains a recycled plastic material or a resin material obtained by mixing recycled plastic materials, A>1 mm and A/B>1 are satisfied, where A is a thickness of a bottom surface center of the bottle main body and B is an average thickness of a bottom surface edge of the bottle main body, and B is the average thickness measured at a plurality of positions, with at least some of the thicknesses used to calculate B being different from each other.

* * * * *